US011069887B2

(12) United States Patent
Hirama et al.

(10) Patent No.: US 11,069,887 B2
(45) Date of Patent: Jul. 20, 2021

(54) NEGATIVE ELECTRODE, BATTERY, BATTERY PACK, ELECTRONIC APPARATUS, ELECTRICALLY DRIVEN VEHICLE, ELECTRICAL STORAGE DEVICE, AND ELECTRIC POWER SYSTEM

(71) Applicant: Murata Manufacturing Co., Ltd., Kyoto (JP)

(72) Inventors: Akira Hirama, Fukushima (JP); Yusuke Suzuki, Kanagawa (JP); Akira Yamaguchi, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 15/571,728

(22) PCT Filed: Apr. 22, 2016

(86) PCT No.: PCT/JP2016/002155
§ 371 (c)(1),
(2) Date: Nov. 3, 2017

(87) PCT Pub. No.: WO2017/017868
PCT Pub. Date: Feb. 2, 2017

(65) Prior Publication Data

US 2018/0159120 A1 Jun. 7, 2018

(30) Foreign Application Priority Data

Jul. 28, 2015 (JP) ............................ JP2015-148438

(51) Int. Cl.
*H01M 4/62* (2006.01)
*H01M 4/134* (2010.01)
(Continued)

(52) U.S. Cl.
CPC ............ *H01M 4/134* (2013.01); *B60L 50/64* (2019.02); *H01M 4/1395* (2013.01); *H01M 4/38* (2013.01);
(Continued)

(58) Field of Classification Search
CPC ...... H01M 4/134; H01M 4/386; H01M 4/623; H01M 4/62; H01M 4/1395; H01M 4/48;
(Continued)

(56) References Cited

U.S. PATENT DOCUMENTS

2007/0092796 A1* 4/2007 Matsuda ................ H01M 4/38 429/217
2008/0187838 A1* 8/2008 Le ......................... H01M 4/134 429/231.95
(Continued)

FOREIGN PATENT DOCUMENTS

CN 1866585 11/2006
CN 100401577 7/2008
(Continued)

OTHER PUBLICATIONS

Komaba et al. "Polyacrylate Modifier for Graphite Anode of Lithium-Ion Batteries." Electrochemical and Solid-State Letters 12 (5) A107-A110 (Year: 2009).*
(Continued)

*Primary Examiner* — Michael L Dignan
(74) *Attorney, Agent, or Firm* — K&L Gates LLP

(57) ABSTRACT

Provided is a battery including a positive electrode, a negative electrode, and an electrolytic solution. The negative electrode includes a negative electrode active material layer including a negative electrode active material and a binding agent. The negative electrode active material includes a silicon-containing material. The binding agent includes a fluorine-containing resin and a polyacrylic acid metal salt. A
(Continued)

POSITIVE ELECTRODE LEAD 25
BATTERY LID 14
DISC PLATE 15A
SAFETY VALVE MECHANISM 15
16 POSITIVE TEMPERATURE COEFFICIENT ELEMENT
17 GASKET
12 INSULATING PLATE
11 BATTERY CASING
20 WOUND ELECTRODE BODY
21 POSITIVE ELECTRODE
22 NEGATIVE ELECTRODE
23 SEPARATOR
24 CENTER PIN
13 INSULATING PLATE
26 NEGATIVE ELECTRODE LEAD total amount of the fluorine-containing resin and the polyacrylic acid metal salt is 10 parts by mass to 30 parts by mass on the basis of 100 parts by mass of the negative electrode active material.

20 Claims, 10 Drawing Sheets

(51) Int. Cl.

| | |
|---|---|
| ***H01M 4/1395*** | (2010.01) |
| ***H01M 4/38*** | (2006.01) |
| ***B60L 50/64*** | (2019.01) |
| ***H01M 4/48*** | (2010.01) |
| *H01M 10/0525* | (2010.01) |
| *H01M 4/02* | (2006.01) |

(52) U.S. Cl.
CPC ............. *H01M 4/386* (2013.01); *H01M 4/48* (2013.01); *H01M 4/62* (2013.01); *H01M 4/623* (2013.01); *H01M 10/0525* (2013.01); *H01M 2004/027* (2013.01); *Y02E 60/10* (2013.01)

(58) Field of Classification Search
CPC ............... H01M 4/38; H01M 10/0525; H01M 2004/027; B60L 50/64; Y02E 60/122
See application file for complete search history.

(56) References Cited

U.S. PATENT DOCUMENTS

| | | | | |
|---|---|---|---|---|
| 2014/0058598 A1* | 2/2014 | Matsui | H01M 4/131 | 701/22 |
| 2014/0065492 A1* | 3/2014 | Komaba | H01M 4/134 | 429/337 |
| 2015/0037672 A1* | 2/2015 | Yang | H01M 10/052 | 429/217 |

FOREIGN PATENT DOCUMENTS

| | | | |
|---|---|---|---|
| CN | 103840144 | | 6/2014 |
| JP | 2006-339093 | A | 12/2006 |
| JP | 2013-229163 | A | 11/2013 |
| JP | 2013-541806 | A | 11/2013 |
| JP | 5382120 | B2 | 1/2014 |
| JP | 5525003 | B2 | 6/2014 |
| JP | 2015-053152 | A | 3/2015 |
| JP | 2015-106437 | A | 6/2015 |
| JP | 2016-024934 | A | 2/2016 |
| WO | 2014/157955 | A1 | 10/2014 |

OTHER PUBLICATIONS

Han et al. "Electrochemical lithium performance and characterization of silicon-graphite composites with lithium, sodium, potassium, and ammonium polyacrylate binders." Phys. Chem. Chem. 2015, 17, 3783-3795 (Year: 2015).*

Komaba et al. "Study on Polymer Binders for High-Capacity SiO Negative Electrode of Li-Ion Batteries." J. Phys. Chem. C 2011, 115, 13487-13495. (Year: 2011).*

Liu et al. "SiOx(O<x±2) Based Anode Materials for Lithium-Ion Batteries." Progress in Chemistry 2015, 27 (4): 336-348 (Year: 2015).*

Japanese Office Action dated Aug. 7, 2018 in corresponding Japanese Application No. 2015-148438.

International Search Report (with English translation) dated Aug. 2, 2016 in corresponding international application No. PCT/JP2016/002155 (7 pages).

Written Opinion dated Aug. 2, 2016 in corresponding international application No. PCT/JP2016/002155 (4 pages).

Chinese Office Action dated Feb. 3, 2020 in corresponding Chinese Application No. 201680025571.8.

* cited by examiner

EXTERNAL POWER SUPPLY
511
CHARGING INLET
500
WHEEL
505a
WHEEL
505b
502
GENERATOR
ENGINE
501
VARIOUS SENSORS
510
VEHICLE CONTROL DEVICE
509
BATTERY
508
DRIVING WHEEL
504a
DRIVING FORCE CONVERTING DEVICE
503
DRIVING WHEEL
504b

NEGATIVE ELECTRODE, BATTERY, BATTERY PACK, ELECTRONIC APPARATUS, ELECTRICALLY DRIVEN VEHICLE, ELECTRICAL STORAGE DEVICE, AND ELECTRIC POWER SYSTEM

CROSS-REFERENCE TO RELATED APPLICATIONS

The present application claims the benefit of International Application No. PCT/JP2016/002155, filed Apr. 22, 2016, which claims priority to Japanese Application No. 2015-148438, filed Jul. 28, 2015, the disclosures of which are incorporated herein by reference.

BACKGROUND

The present technology relates to a negative electrode, a battery, a battery pack, an electronic apparatus, an electrically driven vehicle, an electrical storage device, and an electric power system.

Recently, a portable electronic apparatus such as a cellular phone has become widespread, and a reduction in size and weight, and a long operational lifespan are strongly required. Along with this, a development of a battery such as a lithium ion secondary battery as a power supply of the portable electronic apparatus has been progressed.

In the lithium ion secondary battery, a carbon material has been widely used as a negative electrode active material. Recently, along with higher performance of the portable electronic apparatus, it is demanded to further improve an energy density, and thus examination has been made on use of silicon and the like, which have a large theoretical charging capacity, as the negative electrode active material instead of the carbon material.

Patent Document 1 to Patent Document 5 disclose a technology related to an electrode or an electrode mixture slurry of a lithium ion secondary battery. In Patent Document 1 to Patent Document 5, as a binding agent that is included in the electrode or the electrode mixture slurry, polyacrylic acid, polyvinylidene fluoride, polyimide, and the like are used.

CITATION LIST

Patent Document

Patent Document 1: Japanese Patent Application Laid-Open No. 2013-229163

Patent Document 2: Japanese Patent Application Laid-Open No. 2006-339093

Patent Document 3: Japanese Patent No. 5525003

Patent Document 4: Japanese Patent No. 5382120

Patent Document 5: Japanese Patent Application National Laid-Open No. 2013-541806

SUMMARY

Problems to be Solved by the Invention

In a battery that uses a silicon-containing material as a negative electrode active material, it is required to suppress expansion of a negative electrode, and to improve cycle characteristics and process suitability.

Accordingly, an object of the present technology is to provide a negative electrode, a battery, a battery pack, an electronic apparatus, an electrically driven vehicle, an electrical storage device, and an electric power system which are capable of suppressing negative electrode expansion and improving cycle characteristics and process suitability.

Solutions to Problems

To solve the problem, the present technology is a negative electrode, including: a negative electrode active material layer including a negative electrode active material and a binding agent, in which the negative electrode active material includes a silicon-containing material, the binding agent includes a fluorine-containing resin and a polyacrylic acid metal salt, and a total amount of the fluorine-containing resin and the polyacrylic acid metal salt is 10 parts by mass to 30 parts by mass on the basis of 100 parts by mass of the negative electrode active material.

The present technology is a battery, including: a positive electrode; a negative electrode; and an electrolyte, in which the negative electrode includes a negative electrode active material layer including a negative electrode active material and a binding agent, the negative electrode active material includes a silicon-containing material, the binding agent includes a fluorine-containing resin and a polyacrylic acid metal salt, and a total amount of the fluorine-containing resin and the polyacrylic acid metal salt is 10 parts by mass to 30 parts by mass on the basis of 100 parts by mass of the negative electrode active material.

In addition, according to the present technology, there are provided a battery pack, an electronic apparatus, an electrically driven vehicle, an electrical storage device, and an electric power system which include the battery.

Effects of the Invention

According to the negative electrode of the present technology, the fluorine-containing resin and the polyacrylic acid metal salt are used in a predetermined amount as the binding agent, and thus it is possible to suppress negative electrode expansion and to improve cycle characteristics and process suitability. Even in the battery, the battery pack, the electronic apparatus, the electrically driven vehicle, the electrical storage device, and the electric power system of the present technology, a similar effect can be attained.

DETAILED DESCRIPTION

Hereinafter, embodiments of the present technology will be described. Furthermore, description will be made in the following order.

1. First Embodiment (Example of Cylindrical Battery)
2. Second Embodiment (Example of Laminated Film Type Battery)
3. Third Embodiment (Example of Battery Pack)
4. Fourth Embodiment (Example of Electronic Apparatus)
5. Fifth Embodiment (Example of Electrical Storage System)
6. Sixth Embodiment (Example of Electrically Driven Vehicle)
7. Other Embodiments (Modification Examples)

Furthermore, the following embodiments and the like are appropriate specific examples of the present technology, and the contents of the present technology are not limited to the embodiments. In addition, effects described in this specification are illustrative only, and there is no limitation thereto. In addition, it should be understood that existence of effects different from the exemplified effects are possible.

1. First Embodiment (1-1) Configuration Example of Nonaqueous Electrolyte Battery In a first embodiment of the present technology, description will be given of a cylindrical nonaqueous electrolyte secondary battery (hereinafter, referred to as "nonaqueous electrolyte battery" or simply referred to as "battery") as an example with reference to FIGS. 1 and 2.

Figure 1:
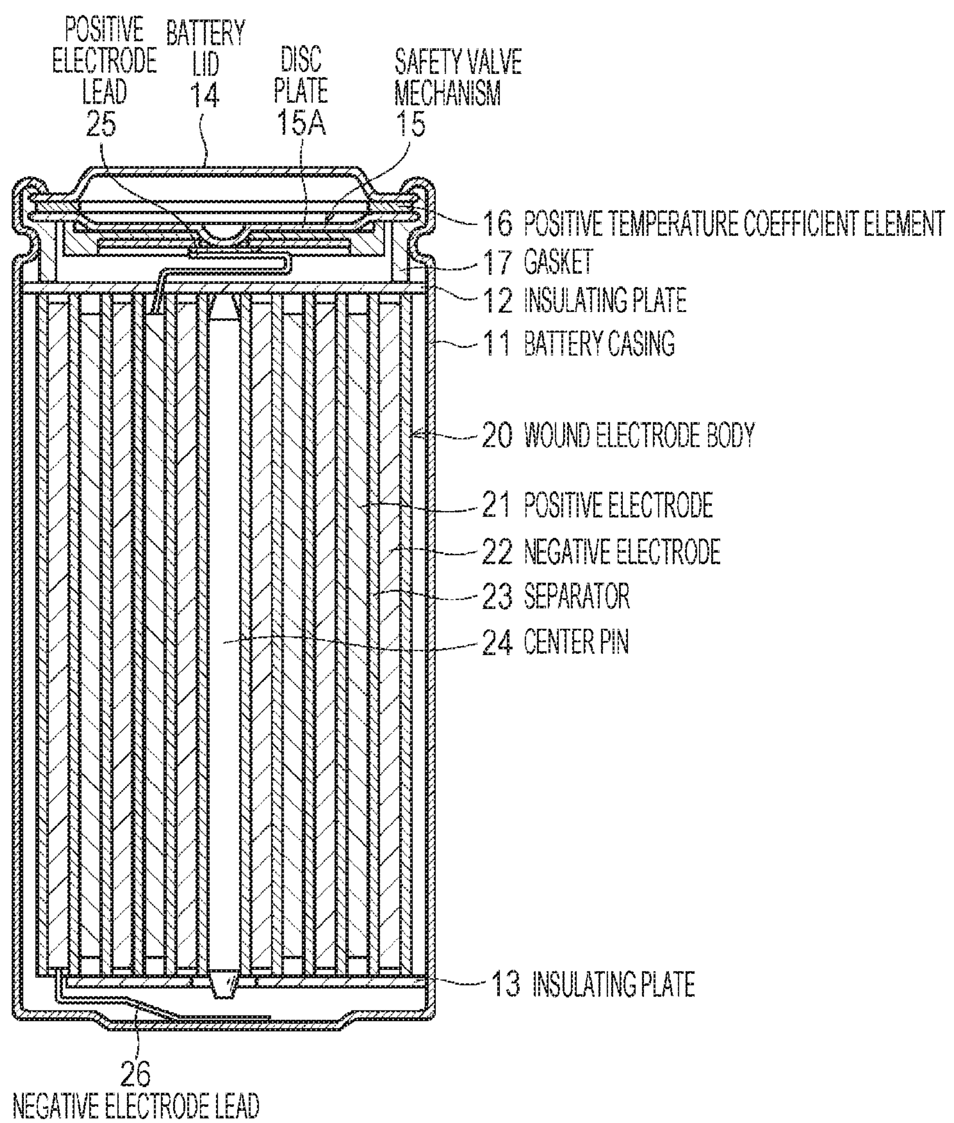
FIG. 1 is a cross-sectional view illustrating a configuration of a battery according to an embodiment of the present technology.

As illustrated in FIG. 1, in the nonaqueous electrolyte battery, mainly, a wound electrode body 20 and a pair of insulating plates 12 and 13 are accommodated in a battery casing 11 having an approximately hollow and cylindrical shape. A battery structure using the battery casing 11 is called a cylindrical type.

For example, the battery casing 11 has a hollow structure in which one end is closed and the other end is opened, and is constituted by iron (Fe), aluminum (Al), alloys thereof, or the like. Furthermore, in a case where the battery casing 11 is constituted by iron, for example, a surface of the battery casing 11 may be plated with nickel (Ni), and the like. The pair of insulating plates 12 and 13 interpose the wound electrode body 20 therebetween from upper and lower sides, and are disposed to extend in a direction perpendicular to a winding peripheral surface of the wound electrode body 20.

A battery lid 14, a safety valve mechanism 15, and a positive temperature coefficient element (PTC element) 16 are caulked into the opened end of the battery casing 11 through a gasket 17, and the battery casing 11 is hermetically sealed. For example, the battery lid 14 is constituted by a material similar to the material of the battery casing 11. The safety valve mechanism 15 and the positive temperature coefficient element 16 are provided on an inner side of the battery lid 14.

The safety valve mechanism 15 is electrically connected to the battery lid 14 through the positive temperature coefficient element 16. In the safety valve mechanism 15, in a case where an inner pressure becomes a constant pressure or higher due to internal short-circuit, heating from an outer side, and the like, a disc plate 15A is inverted to cut off electrical connection between the battery lid 14 and the wound electrode body 20.

In the positive temperature coefficient element 16, as a temperature rises, resistance increases (current is limited) to prevent abnormal heat generation caused by a large current. For example, the gasket 17 is constituted by an insulating material, and asphalt is applied onto a surface of the gasket 17.

In the wound electrode body 20, a positive electrode 21 and a negative electrode 22 are laminated and wound with a separator 23 interposed therebetween. A center pin 24 may be inserted into the center of the wound electrode body 20.

A positive electrode lead 25 is connected to the positive electrode 21 of the wound electrode body 20, and a negative electrode lead 26 is connected to the negative electrode 22. The positive electrode lead 25 is welded to the safety valve mechanism 15 to be electrically connected to the battery lid 14, and the negative electrode lead 26 is welded to the battery casing 11 to be electrically connected thereto.

For example, the positive electrode lead 25 is a thin sheet-shaped conductive member, and is constituted by, for example, aluminum and the like. For example, the negative electrode lead 26 is a thin sheet-shaped conductive member, and is constituted by copper (Cu), nickel (Ni), stainless steel (SUS), and the like.

(Positive Electrode)

For example, in the positive electrode 21, a positive electrode active material layer 21B is provided on both surfaces of a positive electrode current collector 21A. Furthermore, the positive electrode 21 may include a region in which the positive electrode active material layer 21B is provided only on one surface of the positive electrode current collector 21A.

As the positive electrode current collector 21A, for example, metallic foil such as aluminum foil, nickel foil, and stainless steel foil can be used.

The positive electrode active material layer 21B contains a positive electrode active material. The positive electrode active material layer 21B may contain other materials such as a conductive agent and a binding agent as necessary.

(Positive Electrode Active Material)

As the positive electrode active material, for example, a material capable of intercalating and deintercalating lithium can be used. As the positive electrode active material, for example, a lithium-containing compound can be used.

Examples of the lithium-containing compound include a composite oxide (referred to as "lithium-transition metal composite oxide) that contains lithium and a transition metal element, a phosphate compound (referred to as lithium-transition metal phosphate compound) that contains lithium and a transition metal element, and the like. As the lithium-containing compound, a compound, which contains at least one kind among cobalt (Co), nickel, manganese (Mn), and iron as the transition metal element, is preferable. The reason for this is that a higher voltage is obtained.

Examples of the lithium-transition metal composite oxide include a lithium-transition metal composite oxide having a layered rock salt type structure, a lithium-transition metal composite oxide having a spinel type structure, and the like.

Examples of the lithium-transition metal composite oxide having the layered rock salt type structure include a lithium-containing compound expressed by a general formula $Li_xM1O_2$ (in the formula, M1 represents elements including one or more kinds of transition metal elements. A value of x satisfies a relationship of $0.05 \leq x \leq 1.10$ as an example. The value of x is different depending on a battery charging and discharging state. Furthermore, the value of x is not limited to the relationship.), and the like. Specific examples of the lithium-transition metal composite oxide include a lithium-cobalt composite oxide ($Li_xCoO_2$), a lithium-nickel composite oxide ($Li_xNiO_2$), a lithium-nickel-cobalt composite oxide ($Li_xNi_{1-z}Co_zO_2$ ($0<z<1$)), a lithium-nickel-cobalt-manganese composite oxide ($Li_xNi_{(1-v-w)}Co_vMn_wO_2$ ($0<v+w<1$, $v>0$, $w>0$)), a lithium-cobalt-aluminum-magnesium composite oxide ($Li_xCo_{(1-p-q)}Al_pMg_qO_2$ ($0<p+q<1$, $p>0$, $q>0$)), and the like.

Examples of the lithium-transition metal composite oxide having a spinel type structure include a lithium-manganese composite oxide ($LiMn_2O_4$), a lithium-manganese-nickel composite oxide ($Li_xMn_{2-t}Ni_tO_4$ ($0<t<2$)), and the like.

Examples of the lithium-transition metal phosphate compound include a lithium-transition metal phosphate compound having an olivine type structure, and the like.

Examples of the lithium-transition metal phosphate compound having an olivine type structure include a lithium-containing compound expressed by a general formula $Li_yM2PO_4$ (in the formula, M2 represents elements including one or more kinds of transition metal elements. A value of y satisfies a relationship of $0.05 \leq y \leq 1.10$ as an example. The value of y is different depending on a battery charging and discharging state. Furthermore, the value of y is not limited to the range.), and the like. Specific examples of the lithium-transition metal phosphate compound include lithium-iron phosphate compound ($Li_yFePO_4$), a lithium-iron-manganese phosphate compound ($Li_yFe_{1-u}Mn_uPO_4$ ($0<u<1$)), and the like.

As the positive electrode active material, coated particles, which include particles of the above-described lithium-containing compound, and a coating layer that is provided on at least a part of a surface of the lithium-containing compound particles, may be used. When using the coated particles, it is possible to further improve battery characteristics.

The coating layer is provided on at least a part of the surface of the particles (base material particles) of the lithium-containing compound that becomes a base material, and has a composition element or a composition ratio that is different from that of the base material particles. Examples of the coating layer include a coating layer including an oxide, a transition metal compound, and the like. Specific example of the coating layer include an oxide that includes at least one of lithium, nickel, and manganese, a compound that includes at least one kind selected from the group consisting of nickel, cobalt, manganese, iron, aluminum, magnesium (Mg), and zinc (Zn), oxygen (O), and phosphorus (P), and the like. The coating layer may include a halide such as lithium fluoride, or a chalcogenide other than oxygen.

Existence of the coating layer can be confirmed by examining a concentration variation of a constituent element from a surface of the positive electrode active material toward the inside thereof. For example, the concentration variation can be obtained by measuring a composition of the lithium-containing compound particles through auger electron spectroscopy (AES) or secondary ion mass spectrometry (SIMS) while cutting the lithium-containing compound particles, on which the coating layer is provided, through sputtering or the like. In addition, the concentration variation can be measured as follows. The lithium-containing compound particles provided with the coating layer is gradually dissolved in an acidic solution, and a variation in an amount of elution with the passage of time is measured through inductively coupled plasma (ICP) spectrometry or the like.

In addition, as the positive electrode active material, for example, an oxide, a disulfide, a chalcogenide (particularly, a layered compound or a spinel-type compound) that does not contain lithium, a conductive polymer, and the like can be used. Examples of the oxide include vanadium oxide ($V_2O_5$), titanium dioxide ($TiO_2$), manganese dioxide ($MnO_2$), and the like. Examples of the disulfide include iron disulfide ($FeS_2$), titanium disulfide ($TiS_2$), molybdenum disulfide ($MoS_2$), and the like. Examples of the chalcogenide that does not contain lithium include niobium diselenide ($NbSe_2$), and the like. Examples of the conductive polymer include sulfur, polyaniline, polythiophene, polyacetylene, polypyrrole, and the like.

The positive electrode active material may be a positive electrode active material other than the above-described positive electrode active materials. In addition, two or more kinds of the above-described positive electrode active materials may be mixed in an arbitrary combination.

(Conductive Agent)

As the conductive agent, for example, a carbon material, and the like can be used. Examples of the carbon material include graphite, carbon black, acetylene black, and the like. Furthermore, the conductive agent may be a metal material, a conductive polymer, or the like as long as these materials have conductivity.

(Binding Agent)

As the binding agent (also referred to as "binder"), for example, a resin material and the like can be used. Examples of the resin material include polyvinylidene fluoride (PVdF), polytetrafluoroethylene (PTFE), polyacrylonitrile (PAN), styrene butadiene rubber (SBR), carboxymethyl cellulose (CMC), and the like.

(Negative Electrode)

The negative electrode 22 has a structure in which a negative electrode active material layer 22B is provided on both surfaces of a negative electrode current collector 22A. Furthermore, the negative electrode 22 may include a region in which the negative electrode active material layer 22B is provided on only one surface of the negative electrode current collector 22A.

As the negative electrode current collector 22A, for example, metallic foil such as copper foil can be used.

The negative electrode active material layer 22B includes a negative electrode active material and a binding agent. The negative electrode active material layer 22B may contain other materials such as a conductive agent as necessary. As the conductive agent, materials similar to the conductive agent of the positive electrode 21, and the like can be used.

(Negative Electrode Active Material)

As the negative electrode active material, for example, a material capable of intercalating and deintercalating lithium can be used. Specifically, as the negative electrode active material, a material (referred to as a silicon-containing material) that contains silicon as a constituent element can be used. The silicon-containing material has a great capability of intercalating and deintercalating lithium and thus a high energy density can be obtained.

Examples of the silicon-containing material include elementary silicon, a silicon alloy, or a silicon compound, a material that includes one kind or two or more kinds of phases of the elementary silicon at least at apart, and the like. Furthermore, in the present technology, the "alloy" also includes an alloy containing one or more kinds of metallic elements and one or more kinds of metalloid elements in addition to the alloy that is constituted by two or more kinds of metallic elements. In addition, the "alloy" may contain a nonmetallic element. The texture of the alloy includes a solid-solution, a eutectic crystal (a eutectic mixture), an intermetallic compound, and a texture in which two or more kinds thereof coexist.

Examples of the silicon alloy include an alloy that contains at least one kind among the group consisting of tin, nickel, copper, iron, cobalt, manganese, zinc, indium, silver, titanium, germanium, bismuth, antimony (Sb), and chromium (Cr) as a second constituent element other than silicon.

In the silicon alloy, it is preferable that a silicon phase is dispersed in a matrix phase constituted by an elementary phase or a compound phase that includes one or more kinds of alloy constituent elements. Examples of the silicon alloy include an alloy in which silicon is finely dispersed in a heterogeneous metal different from silicon, and the like. Typical examples of heterogeneous metallic elements include iron and the like. The reason for this is because it is possible to raise a utilization rate of an active material with respect to theoretical capacity and it is possible to further improve cycle characteristics.

Examples of the silicon compound include a silicon oxide that contains silicon and oxygen, a compound of silicon and carbon which contains silicon and carbon, and the like. Furthermore, the silicon compound may contain, for example, one kind or two or more kinds of elements described in the silicon alloy as a constituent element other than silicon. Examples of the silicon oxide include $SiO_x$, $SiO_2$, and the like. Furthermore, in the $SiO_x$, a composition ratio of O is set to x because it may be deviated from a stoichiometric ratio in some cases. For example, x satisfies a relationship of $0<x<2$.

The negative electrode active material may include a material capable of intercalating and deintercalating lithium other than the silicon-containing material. In addition, two or more kinds of the negative electrode active materials exemplified as described above may be mixed in an arbitrary composition.

(Binding Agent)

The binding agent contains both of the polyacrylic acid metal salt and the fluorine-containing resin, and a total amount of the polyacrylic acid metal salt and the fluorine-containing resin is set to 10 parts by mass to 30 parts by mass on the basis of 100 parts by mass of the negative electrode active material. With this arrangement, it is possible to suppress the negative electrode expansion, and it is possible to improve the cycle characteristics and the process suitability.

The reason why the binding agent is set to have the above-described configuration is as follows. In a case where the binding agent only includes the fluorine-containing resin such as polyvinylidene fluoride, a binding force decreases, and thus there is a problem that the cycle characteristics deteriorate. In a case where the binding agent includes only the polyacrylic acid metal salt, the binding force is improved and thus the cycle characteristics are improved. However, the polyacrylic acid metal salt is a binding agent that is hard and has low flexibility, and thus there is a problem that cracking is likely to occur in an electrode.

In addition, a ratio of the polyacrylic acid metal salt contained in the binding agent and the process suitability has a trade-off relationship. For example, when the ratio of the polyacrylic acid metal salt contained in the binding agent increases, in a negative electrode forming process, a negative electrode active material layer formed through application and drying of negative electrode mixture slurry becomes crisp and is broken, and thus the process suitability deteriorates.

In contrast, in the present technology, the binding agent contains both of the polyacrylic acid metal salt and the fluorine-containing resin, and thus the above-described problem is improved.

In addition, in a case where the total amount of the polyacrylic acid metal salt and the fluorine-containing resin is less than the above-described range, a binding force of the binding agent decreases, and thus there is a problem that it is difficult to suppress negative electrode expansion and the cycle characteristics deteriorate. In a case where the total amount of the polyacrylic acid metal salt and the fluorine-containing resin is greater than the above-described range, a binder component excessively increases, and thus resistance increases and charging and discharging efficiency deteriorate. As a result, there is a problem that the cycle characteristics deteriorate.

In contrast, in the present technology, the total amount of the polyacrylic acid metal salt and the fluorine-containing resin is set to 10 parts by mass to 30 parts by mass on the basis of 100 parts by mass of the negative electrode active material, and thus the above-described problems are improved.

(Polyacrylic Acid Metal Salt)

Examples of the polyacrylic acid metal salt include lithium polyacrylate, magnesium polyacrylate, sodium polyacrylate, and the like. Among these, lithium polyacrylate is preferable when considering that a more excellent effect can be attained.

As a typical example, a weight-average molecular weight of the polyacrylic acid metal salt is 100,000 to 1,000,000. Furthermore, the weight-average molecular weight is not limited thereto.

In a case where the negative electrode active material includes the alloy that contains silicon and a metal, a polyacrylic acid metal salt that is a neutralizing salt is used, and thus it is possible to avoid an acidic state, and it is possible to suppress elution of an alloyed metal. In contrast, in the case of using polyacrylic acid, polyacrylic acid and a metal react with each other, and thus hydrogen is generated, and the alloyed metal is apt to be eluted. For example, in a case where silicon and a metal that constitutes the metal have ionization tendency higher than that of hydrogen, elution of the alloy metal is likely to occur. Accordingly, in this case, it is particularly effective to use the polyacrylic acid metal salt, and this case is preferable.

(Amount of Polyacrylic Acid Metal Salt Contained)

It is preferable that the amount of the polyacrylic acid metal salt contained is 5 parts by mass to 15 parts by mass on the basis of 100 parts by mass of the negative electrode active material. When the amount of the polyacrylic acid metal salt contained increases, it is possible to sufficiently form a film of the polyacrylic acid metal salt that covers the negative electrode active material, and thus it is possible to further suppress expansion of the negative electrode active material. As a result, it is possible to further improve the cycle characteristics. On the other hand, when the amount of the polyacrylic acid metal salt contained is excessive, the process suitability tends to deteriorate. Accordingly, the above-described range is preferable.

(Fluorine-Containing Resin)

The "fluorine-containing resin" represents a resin that contains fluorine, and typically a polymer of unsaturated hydrocarbon that contains fluorine. Examples of the fluorine-containing resin include a homopolymer or copolymer such as polyvinylidene fluoride and a polyvinylidene fluoride-hexafluoroethylene copolymer which include a repeating unit derived from vinylidene fluoride, polytetrafluoroethylene, and the like. Among these, polyvinylidene fluoride is preferable. These may be one kind or two or more kinds.

(Amount of Fluorine-Containing Resin Contained)

It is preferable that the amount of fluorine-containing resin contained is 0.5 parts by mass to 15 parts by mass on the basis of 100 parts by mass of the negative electrode active material. In a case where the amount of the fluorine-containing resin contained increases, the process suitability can be improved. On the other hand, resistance increases due to an excessive binder component, and the cycle characteristics tend to deteriorate. Accordingly, the above-described range is preferable.

(Separator)

The separator 23 separates the positive electrode 21 and the negative electrode 22 from each other, and allows lithium ion to be transmitted therethrough while preventing current short-circuit caused by contact between the both electrodes.

For example, the separator 23 is a porous membrane that includes a resin. For example, the porous membrane that includes a resin is obtained by shaping a resin material by a stretching and perforating method, a phase separating method, and the like. Furthermore, a method of manufacturing the porous membrane that includes a resin is not limited to the methods.

As the resin material that constitutes the separator 23, for example, a polyolefin resin such as polypropylene and polyethylene, an acrylic resin, a styrene resin, a polyester resin, a nylon resin, and the like can be used.

The separator 23 may have a structure in which two or more of porous membranes that include a resin are stacked. The porous membrane that includes a resin may be a porous membrane in which two or more kinds of resin materials are mixed (a porous membrane that is formed by melting and kneading two or more kinds of resin materials). The porous membrane that includes the polyolefin resin is preferable when considering that separating properties between the positive electrode 21 and the negative electrode 22 are excellent and it is possible to further reduce occurrence of internal short-circuit.

The separator 23 may be non-woven fabric. The non-woven fabric is a structure in which a plurality of pieces of fiber are joined or intertwined, or joined and intertwined without being woven or knitted. As a raw material of the non-woven fabric, the majority of materials capable of being processed into fiber can be used, and a function in accordance with a purpose and a use can be provided by adjusting a shape such as a fiber length and a fiber thickness.

Examples of the non-woven fiber include air-permeable membranes (polyethylene terephthalate non-woven fabric) which use polyethylene terephthalate (PET) fiber, and the like. Furthermore, the air-permeable membranes represent membranes having air-permeability. In addition, examples of the non-woven fabric include air-permeable membranes which use aramid fiber, glass fiber, cellulose fiber, polyolefin fiber, nylon fiber, and the like. The non-woven fabric may use two or more kinds of fiber.

The separator 23 may include particles such as inorganic particles and organic particles. Examples of the separator 23 include a separator that includes a base material and a surface layer formed on at least one of both main surfaces of the base material. Examples of the base material include the porous membrane, the non-woven fabric, and the like which include the resin. Examples of the surface layer include a porous layer that includes a resin material and particles, and the like. For example, the resin material may be fibrillated, and may have a three-dimensional network structure in which fibrils are continuously connected to each other.

(Particles)

As particles, for example, at least one of inorganic particles and organic particles can be used. Specific examples of the inorganic particles include a metal oxide, a metal oxide hydrate, a metal hydroxide, a metal nitride, a metal carbide, a metal sulfide, a mineral, and the like which are electrically insulating inorganic particles.

Examples of the metal oxide or the metal oxide hydrate include aluminum oxide (alumina, $Al_2O_3$), boehmite ($Al_2O_3H_2O$ or AlOOH), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$), zinc oxide (ZnO), and the like.

Examples of the metal nitride include silicon nitride ($Si_3N_4$), aluminum nitride (AlN), boron nitride (BN), titanium nitride (TiN), and the like. Examples of the metal carbide include silicon carbide (SiC), boron carbide ($B_4C$), and the like. Examples of the metal sulfide include barium sulfide ($BaSO_4$), and the like.

Examples of the metal hydroxide include aluminum hydroxide ($Al(OH)_3$), and the like. Examples of the mineral include porous aluminosilicate such as zeolite ($M_{2/n}O.Al_2O_3.xSiO_2.yH_2O$, M represents a metallic element, $x \geq 2$, $y \geq 0$), layered silicate such as talk ($Mg_3Si_4O_{10}(OH)_2$), barium titanate ($BaTiO_3$), strontium titanate ($SrTiO_3$), and the like.

Examples of other inorganic particles include particles of a lithium compound, particles of a carbon material, and the like. Examples of the lithium compound include $Li_2O_4$, $Li_3PO_4$, LiF, and the like. Examples of the carbon material include graphite, carbon nanotube, diamond, and the like.

The inorganic particles may be used alone or two or more kinds thereof may be mixed and used. The shape of the inorganic particles is not particularly limited, and a spherical shape, a fibrous shape, a needle shape, a squamous shape, a sheet shape, and the like are possible.

Examples of the material that constitutes the organic particles include a fluorine-containing resin such as polyvinylidene fluoride and polytetrafluoroethylene, a fluorine-containing rubber such as a vinylidene fluoride-tetrafluoroethylene copolymer and an ethylene-tetrafluoroethylene copolymer, rubbers such as a styrene-butadiene copolymer or a hydride thereof, an acrylonitrile-butadiene copolymer or a hydride thereof, an acrylonitrile-butadiene-styrene copolymer or a hydride thereof, a methacrylic acid ester-acrylic acid ester copolymer, a styrene-acrylic acid ester copolymer, an acrylonitrile-acrylic acid ester copolymer, an ethylene propylene rubber, polyvinyl alcohol, and polyvinyl acetate, a cellulose derivative such as ethyl cellulose, methyl cellulose, hydroxyethyl cellulose, and carboxymethyl cellulose, a resin such as polyphenylene ether, polysulfone, polyether sulfone, polyphenylene sulfide, polyetherimide, polyimide, polyamide such as wholly aromatic polyamide (aramide), polyamideimide, polyacrylonitrile, polyvinyl alcohol, polyether, an acrylic acid resin, and polyester with high heat resistance in which at least one of a melting point and a glass transition temperature is 180° C. or higher, and the like.

The materials may be used alone or two or more kinds thereof may be mixed and used. The shape of the organic particles is not particularly limited, and a spherical shape, a fibrous shape, a needle shape, squamous shape, a sheet shape, and the like are possible.

(Electrolytic Solution)

The separator 23 is impregnated with an electrolytic solution that is a liquid electrolyte. For example, the electrolytic solution is a nonaqueous electrolytic solution that includes an electrolyte salt and a nonaqueous solvent that dissolves the electrolyte salt. The nonaqueous electrolytic solution may include an additive and the like as necessary.

As the nonaqueous solvent, cyclic carbonic acid ester such as ethylene carbonate and propylene carbonate can be used, and it is preferable to use a nonaqueous solvent obtained after mixing of any one of ethylene carbonate and propylene carbonate, particularly, both of these. The reason for this is that it is possible to improve cycle characteristics.

As the nonaqueous solvent, it is preferable to use a nonaqueous solvent obtained after mixing of chain carbonic acid ester such as diethyl carbonate, dimethyl carbonate, ethyl methyl carbonate, and methyl propyl carbonate in addition to the cyclic carbonic acid ester. The reason for this is that it is possible to obtain high ion conductivity.

As the nonaqueous solvent, it is preferable to further include 2,4-difluoroanisole or vinylene carbonate. The reason for this is that 2,4-difluoroanisole can improve discharging capacity and vinylene carbonate can improve cycle characteristics. Accordingly, in a case where these are mixed and are used, it is possible to improve discharging capacity and cycle characteristics, and thus this case is preferable.

In addition to these, examples of the nonaqueous solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropionitrile, N,N-dimethylformamide, N-methylpyrrolidinone, N-methyloxazolidinone, N,N-dimethylimidazolidinone, nitromethane, nitroethane, sulfolane, dimethylsulfoxide, trimethyl phosphate, and the like.

Furthermore, a compound, in which at least a part of hydrogen in the nonaqueous solvents is substituted with fluorine, may improve reversibility of an electrode reaction depending on the kind of electrodes which are combined, and thus the compound may be preferable in some cases.

For example, the electrolyte salt contains one kind or two or more kinds of light metal compounds such as a lithium salt. Examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), lithium bromide (LiBr), and the like. Among these, at least one kind among the group consisting of lithium hexafluorophosphate, lithium tetrafluoroborate, lithium perchlorate, and lithium hexafluoroarsenate is preferable, and lithium hexafluorophosphate is more preferable.

(Operation of Nonaqueous Electrolyte Battery)

In the nonaqueous electrolyte battery, for example, in charging, a lithium ion is deintercalated from the positive electrode 21 and is intercalated to the negative electrode 22 though an electrolytic solution that is impregnated to the separator 23. On the other hand, in discharging, for example, a lithium ion is deintercalated from the negative electrode 22, and is intercalated to the positive electrode 21 through the electrolytic solution that is impregnated to the separator 23.

In the nonaqueous electrolyte battery, an open-circuit voltage (that is, a battery voltage) in a fully charged state may be designed to be, for example, in a range of 3.60 V to 6.00 V, preferably 4.25 V to 6.00 V, and more preferably 4.30 V to 4.50 V. For example, in a case where the open-circuit voltage in the fully charged state is 4.25 V or greater in a battery that use a layered rock salt type lithium composite oxide and the like as the positive electrode active material, even in the same positive electrode active material, the amount of lithium deintercalated per unit mass further increases in comparison to a battery of which the open-circuit voltage is 4.20 V, and thus the amount of the positive electrode active material and the amount of the negative electrode active material are adjusted in accordance with this phenomenon. As a result, a high energy density is obtained.

(1-2) Method of Manufacturing Nonaqueous Electrolyte Battery

For example, the nonaqueous electrolyte battery is manufactured by the following procedure.

First, the positive electrode 21 is prepared. First, a positive electrode active material, and as necessary, a binding agent, a conductive agent, and the like are mixed to prepare a positive electrode mixture. Then, the positive electrode mixture is dispersed, for example, in an organic solvent and the like to prepare positive electrode mixture slurry having a paste shape or a slurry shape. Next, the positive electrode mixture slurry is uniformly applied to both surfaces of the positive electrode current collector 21A and is dried to form the positive electrode active material layer 21B. Finally, the positive electrode active material layer 21B is compression-molded by using a roll pressing device and the like while being heated as necessary. In this case, the compression molding may be repeated a plurality of times.

Next, the negative electrode 22 is prepared in a similar procedure as in the positive electrode 21. In this case, a negative electrode mixture obtained by mixing the negative electrode active material, the binding agent, and as necessary, a conductive agent and the like with each other is dispersed, for example, in a water-containing dispersing solvent such as water as a polar solvent to prepare a negative electrode mixture slurry having a paste shape or a slurry shape. Then, the negative electrode mixture slurry is uniformly applied to both surfaces of the negative electrode current collector 22A and is dried to form the negative electrode active material layer 22B. Then, the negative electrode active material layer 22B is compression-molded. Furthermore, the negative electrode mixture slurry of the present technology uses the water-containing dispersing solvent such as water as the polar solvent, and thus this is preferable from the viewpoints of reducing an environmental load and the like.

Finally, the nonaqueous electrolyte battery is assembled by using the positive electrode 21 and the negative electrode 22. First, the positive electrode lead 25 is attached to the positive electrode current collector 21A through welding and the like, and the negative electrode lead 26 is attached to the negative electrode current collector 22A through welding and the like. Continuously, the positive electrode 21 and the negative electrode 22 are laminated through the separator 23 and the resultant laminated body is wound to prepare the wound electrode body 20. Then, the center pin 24 is inserted into the winding center.

Figure 2:
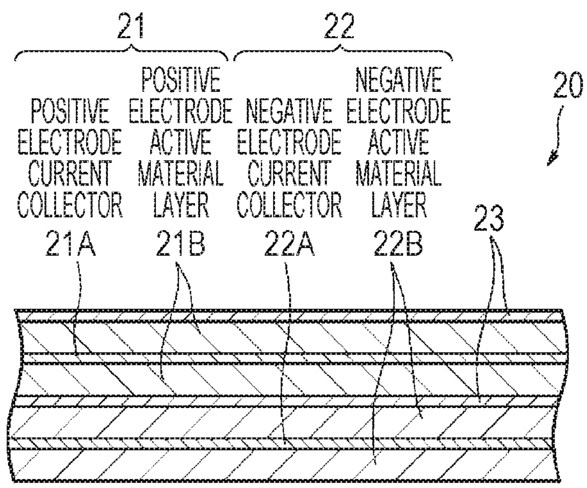
FIG. 2 is an enlarged cross-sectional view illustrating a part of a wound electrode body illustrated in FIG. 1.

Continuously, the wound electrode body 20 is accommodated in the battery casing 11 while being interposed between the pair of insulating plates 12 and 13. In this case, the tip end of the positive electrode lead 25 is attached to the safety valve mechanism 15 through welding and the like, and the tip end of the negative electrode lead 26 is attached to the battery casing 11 through welding and the like. Continuously, an electrolytic solution is injected to the inside of the battery casing 11 to impregnate the separator 23 with the electrolytic solution. Finally, the battery lid 14, the safety valve mechanism 15, and the positive temperature coefficient element 16 are caulked to the opened end of the battery casing 11 through the gasket 17. With this arrangement, the nonaqueous electrolyte battery illustrated in FIGS. 1 and 2 is obtained.

(Effect)

In the first embodiment of the present technology, as the binding agent, both of the polyacrylic acid metal salt and the fluorine-containing resin are used in a predetermined mass defined as a ratio on the basis of the mass of the negative electrode active material, and thus it is possible to suppress the negative electrode expansion and it is possible to improve the cycle characteristics and the process suitability.

Furthermore, hereinafter, a technology related to the present technology will be described in brief for easy understanding of the present technology. In the lithium ion secondary battery that uses silicon and the like as the negative electrode active material, silicon, which intercalates lithium, expands in charging, and is detached from the negative electrode, or the negative electrode active material layer is peeled off from the current collector due to expansion and shrinkage of the negative electrode. As a result, the cycle characteristics deteriorate. Furthermore, when cracking occurs in silicon due to expansion, activity increases, and thus an electrolytic solution is likely to be decomposed. As a result, lithium is apt to be inactive.

In contrast, there is disclosed a technology of improving the cycle characteristics by covering a surface with polyacrylic acid. However, in this technology, polyacrylic acid, which is not neutralized, is used. Accordingly, when using an alloy of silicon and a metal (for example, iron), which has ionization tendency higher than that of hydrogen, as the negative electrode active material, a metal is apt to be eluted from the alloy, and characteristics are apt to deteriorate.

In the case of using polyacrylic acid alone as the binding agent, it is possible to improve the cycle characteristics due to an effect of covering the negative electrode active material. On the other hand, strength is high, and thus winding properties are poor and productivity is apt to deteriorate. In contrast, there is disclosed a technology of providing flexibility to an electrode through mixing of carbon fiber.

There is also disclosed a technology of using polyimide with high strength as the binding agent. Polyimide has high strength. On the other hand, irreversible capacity in initial charging and discharging is great, and thus contribution to an improvement of an energy density is limited.

In the present technology, as the binding agent, both of the polyacrylic acid metal salt and the fluorine-containing resin are used in a predetermined mass defined as a ratio on the basis of the mass of the negative electrode active material. Accordingly, it is possible to improve flexibility related to the electrode and a binding property related to current collector foil, and it is possible to further improve productivity.

Patent Document 4 (Japanese Patent No. 5382120) and Patent Document 5 (Japanese Patent Application National Laid-Open No. 2013-541806) described above do not specifically describe a configuration of using both of the fluorine-containing resin and the polyacrylic acid metal salt in a predetermined mass defined as a ratio on the basis of the mass of the negative electrode active material.

2. Second Embodiment

(2-1) Configuration Example of Laminated Film Type Battery

Figure 3:
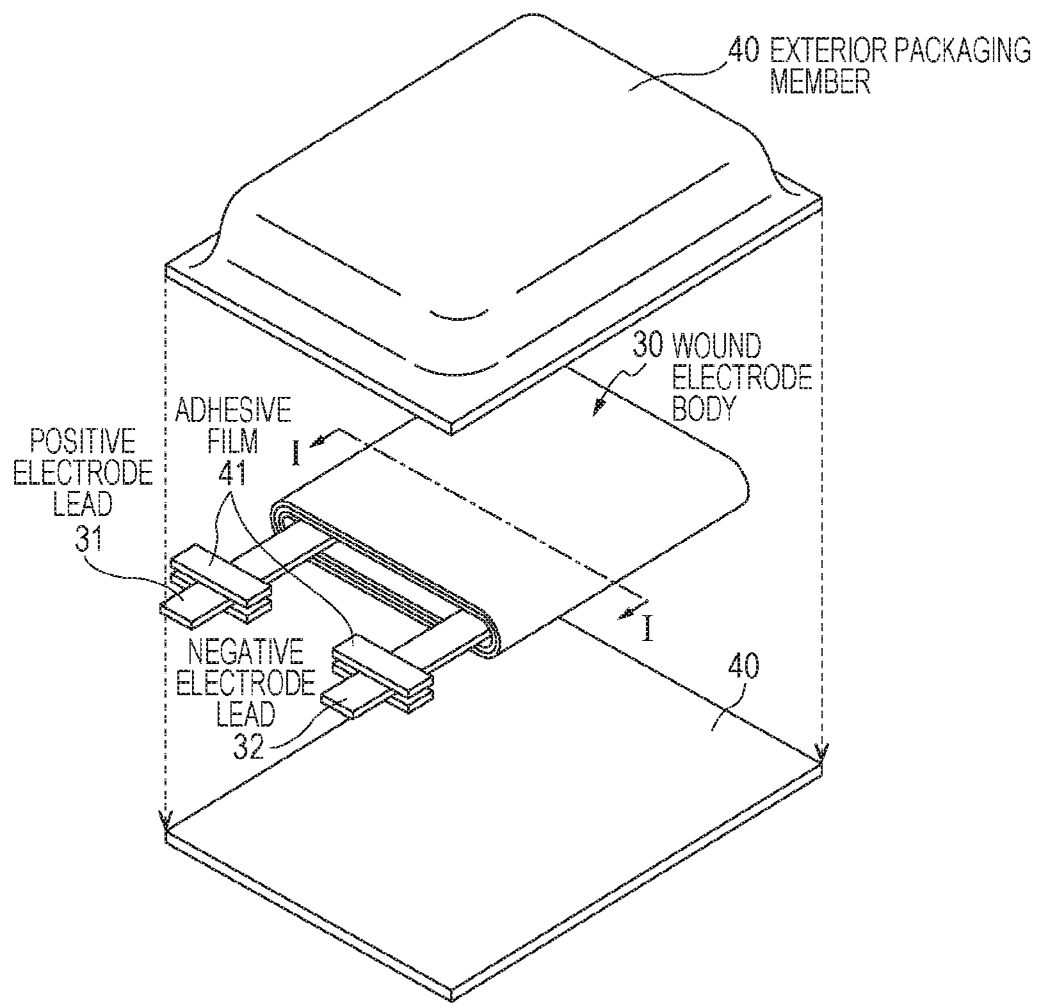
FIG. 3 is an exploded perspective view illustrating a configuration example of a battery according to an embodiment of the present technology.
Figure 4:
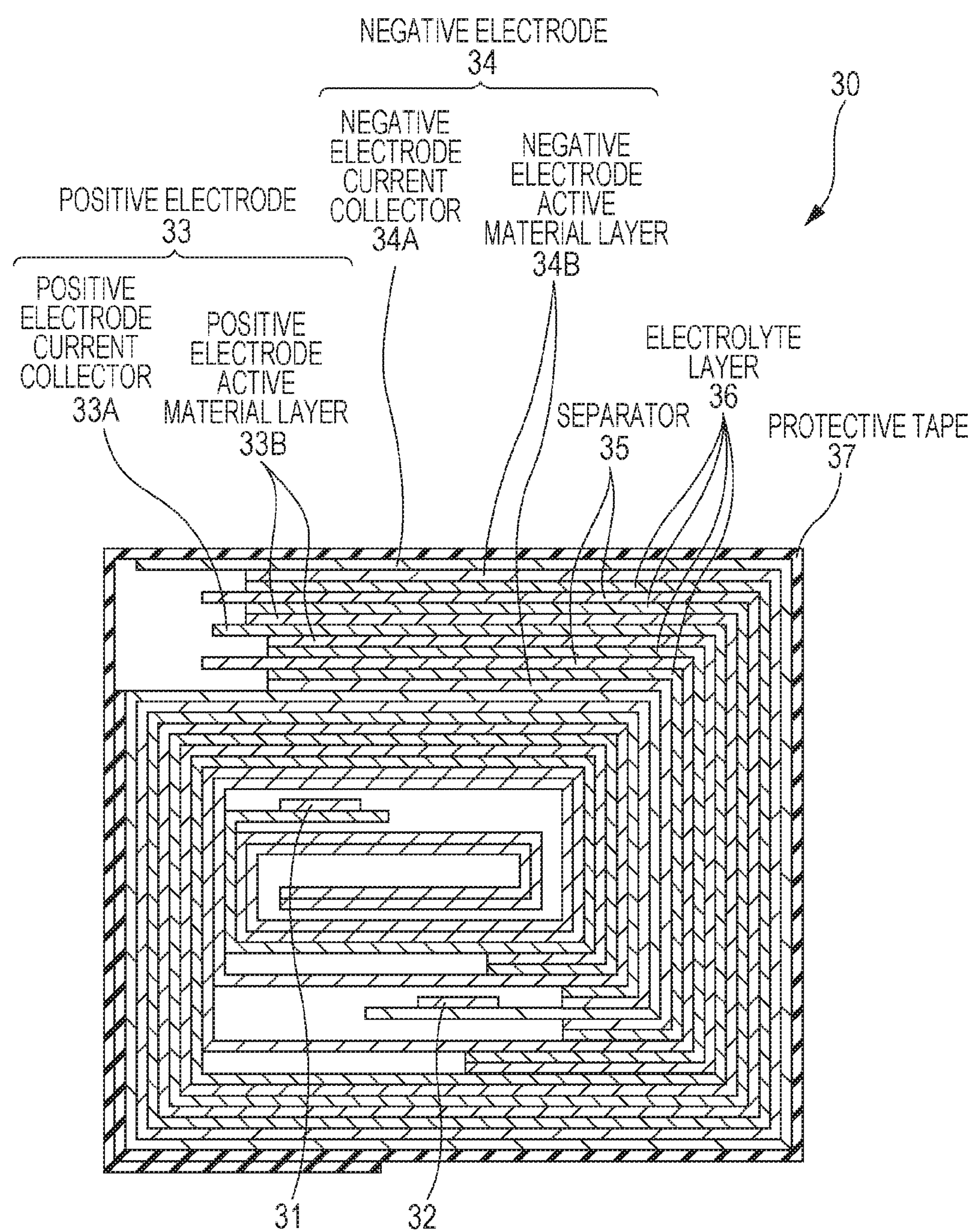
FIG. 4 is a cross-sectional view illustrating a cross-sectional configuration along line I-I in a wound electrode body illustrated in FIG. 3.

In the second embodiment of the present technology, description will be given of a laminated film type battery as an example with reference to FIGS. 3 and 4.

In the nonaqueous electrolyte battery, a wound electrode body 30 is accommodated in an exterior packaging member 40. A positive electrode lead 31 and a negative electrode lead 32 are attached to the wound electrode body 30. For example, the positive electrode lead 31 and the negative electrode lead 32 protrude from the inside of the exterior packaging member 40 toward the outside in the same direction.

(Exterior Packaging member)

The exterior packaging member 40 is a film-shaped member. For example, the exterior packaging member 40 is a laminated film in which a fusion layer, a metal layer, and a surface protective layer are laminated in this order. For example, the fusion layer is constituted by a polyolefin resin such as polyethylene, polypropylene, or the like. For example, the metal layer is constituted by aluminum and the like. For example, the surface protective layer is constituted by nylon, polyethylene terephthalate, or the like. The exterior packaging member 40 may be a laminated film having another lamination structure, a single polymer film, or single metal film.

An adhesive film 41 is interposed between the exterior packaging member 40 and the positive electrode lead 31. Similarly, the adhesive film 41 is interposed between the exterior packaging member 40 and the negative electrode lead 32. For example, the adhesive film 41 is constituted by a material having high adhesiveness with a metal material. Examples of the material include a resin material such as a polyolefin resin.

(Positive Electrode, Negative Electrode, and Separator)

In the wound electrode body 30, a positive electrode 33 and a negative electrode 34 are laminated through a separator 35 and an electrolyte layer 36, and the resultant laminated body is wound. An outermost peripheral portion of the wound electrode body 30 is protected by a protective tape 37. Furthermore, in the wound electrode body 30, the separator 35 may be omitted.

In the positive electrode 33, for example, a positive electrode active material layer 33B is provided on both surfaces of a positive electrode current collector 33A. Configurations of the positive electrode current collector 33A and the positive electrode active material layer 33B are similar to the configurations of the positive electrode current collector 21A and the positive electrode active material layer 21B in the first embodiment. In the negative electrode 34, for example, a negative electrode active material layer 34B is provided on both surfaces of a negative electrode current collector 34A. Configurations of the negative electrode current collector 34A and the negative electrode active material layer 34B are similar to the configurations of the negative electrode current collector 22A and the negative electrode active material layer 22B in the first embodiment.

A configuration of the separator 35 is similar to the configuration of the separator 23 in the first embodiment.

(Electrolyte Layer)

In the electrolyte layer 36, an electrolytic solution is retained by a polymeric compound, and may include other materials such as various additives as necessary. For example, the electrolyte layer 36 is a so-called gel-like electrolyte. The gel-like electrolyte is preferable because high ion conductivity (for example, 1 mS/cm or greater at room temperature) is obtained, and leakage of the electrolytic solution is prevented.

Examples of the polymeric compound include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethyl methacrylate, polyacrylic acid, Polymethacrylic acid, styrene-butadiene rubber, nitrile-butadiene rubber, polystyrene, polycarbonate, a copolymer of vinylidene fluoride and hexafluoropyrene, and the like. These may be used alone, or a plurality of kinds thereof may be mixed. Among these, the polyvinylidene fluoride or the copolymer of vinylidene fluoride and hexafluoropyrene is preferable. The reason for this is that electrochemical stability is obtained.

The electrolytic solution is similar to the electrolytic solution in the first embodiment. However, in the electrolyte layer 36 that is a gel-like electrolyte, a solvent of the electrolytic solution has a broad concept that includes not only a liquid solvent but also a solvent having ion conductivity capable of dissociating an electrolyte salt. Accordingly, in the case of using a polymeric compound having ion conductivity, the polymeric compound is also included in the solvent.

Furthermore, the electrolytic solution may be used as is instead of the gel-like electrolyte layer 36 in which the electrolytic solution is retained by the polymeric compound. In this case, the separator 35 is impregnated with the electrolytic solution.

(Electrolyte Layer Including Particles)

The electrolyte layer 36 may include particles. As the particles, particles similar to the inorganic particles and the organic particles can be used.

(2-2) Method of Manufacturing Nonaqueous Electrolyte Battery

The nonaqueous electrolyte battery is manufactured, for example, by the following three procedures.

(First Manufacturing Method)

In a first manufacturing method, first, the positive electrode 33 and the negative electrode 34 are prepared in a similar manner as in the first embodiment. An electrolytic solution is prepared by dissolving an electrolyte salt in a nonaqueous solvent.

Next, a precursor solution, which includes the electrolytic solution, the polymeric compound, and the solvent, is prepared, and the precursor solution is applied to the positive electrode 33 and the negative electrode 34. Then, the solvent is volatilized to form the gel-like electrolyte layer 36. Continuously, the positive electrode lead 31 is attached to the positive electrode current collector 33A through welding and the like, and the negative electrode lead 32 is attached to the negative electrode current collector 34A through welding and the like.

Next, the positive electrode 33 and the negative electrode 34, in which the electrolyte layer 36 is formed, are laminated through the separator 35, and the resultant laminated body is wound. Then, the protective tape 37 is stuck on an outermost peripheral portion of the resultant wound body, thereby preparing the wound electrode body 30.

Finally, the wound electrode body 30 is interposed between two sheets of film-shaped exterior packaging members 40, and outer peripheral edges of the exterior packaging members 40 are bonded to each other through thermal fusion and the like to seal the wound electrode body 30. At this time, the adhesive film 41 is inserted between each of the positive electrode lead 31 and the negative electrode lead 32 and each of the exterior packaging members 40. With this arrangement, the nonaqueous electrolyte battery illustrated in FIGS. 3 and 4 is obtained.

(Second Manufacturing Method)

In a second manufacturing method, first, the positive electrode lead 31 is attached to the positive electrode 33, and the negative electrode lead 32 is attached to the negative electrode 34. Continuously, the positive electrode 33 and the negative electrode 34 are laminated through the separator 35, and the resultant laminated body is wound. The protective tape 37 is stuck on the outermost peripheral portion of the resultant wound body to prepare a wound body that is a precursor of the wound electrode body 30.

Next, the wound body is inserted between two sheets of film-shaped exterior packaging members 40, and outer peripheral portions excluding an outer peripheral portion on one side are subjected to thermal fusion to be bonded, thereby accommodating the wound body in the resultant bag-shaped exterior packaging member 40. Continuously, a composition for electrolyte, which includes the electrolytic solution, a monomer that is a raw material of the polymeric compound, a polymerization initiator, and as necessary, other materials such as a polymerization inhibitor, is prepared. Then, the composition for electrolyte is injected to the inside of the bag-shaped exterior packaging member 40, and then an opening of the exterior packaging member 40 is sealed through thermal fusion and the like.

Finally, the monomer is thermal polymerized to form a polymeric compound. With this arrangement, the gel-like electrolyte layer 36 is formed. As a result, the nonaqueous electrolyte battery is obtained.

(Third Manufacturing Method)

In a third manufacturing method, first, a wound body is formed in a similar manner as in the second manufacturing method except that the separator 35 in which the polymeric compound is applied to both surfaces thereof is used. Then, the wound body is accommodated in the bag-shaped exterior packaging member 40.

Next, an electrolytic solution is prepared and is injected to the inside of the exterior packaging member 40, and then an opening of the exterior packaging member 40 is hermetically sealed through thermal fusion and the like. Finally, the exterior packaging member 40 is heated while being pressurized to bring the separator 35 into close contact with the positive electrode 33 and the negative electrode 34 through the polymeric compound. With this arrangement, the polymeric compound is impregnated with the electrolytic solution, and the polymeric compound is gelated to form the electrolyte layer 36. As a result, the nonaqueous electrolyte battery is obtained.

3. Third Embodiment

Figure 5:
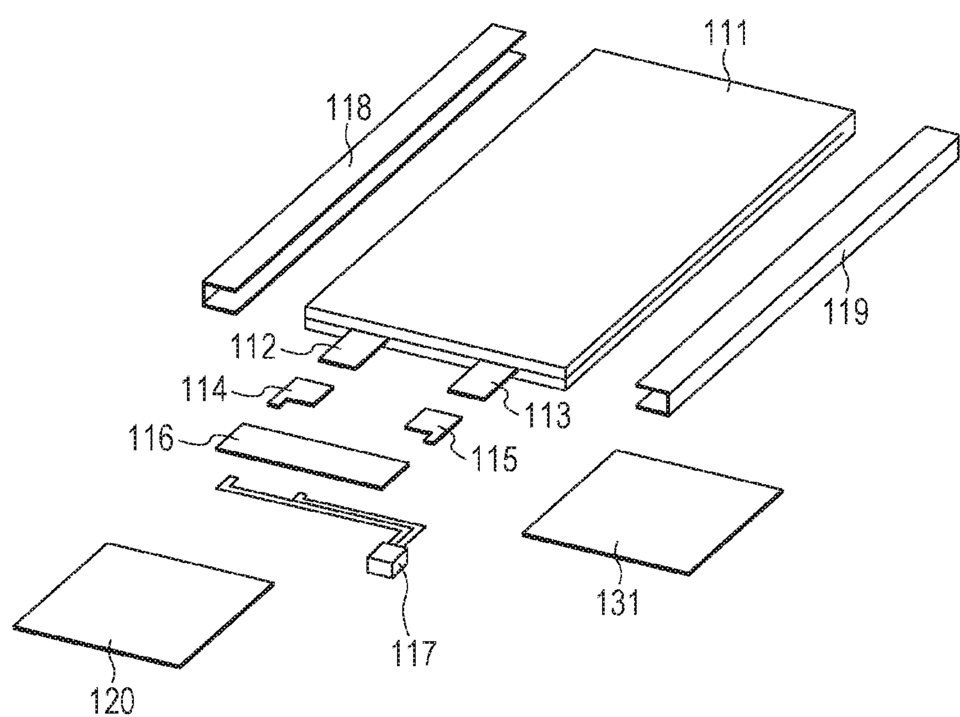
FIG. 5 is a perspective view illustrating a configuration example of a battery pack according to an embodiment of the present technology.

In the third embodiment of the present technology, description will be given of an example of a configuration of a battery pack with reference to FIGS. 5 and 6.

The battery pack is a simple type battery pack (a so-called a soft pack) using one secondary battery (single battery), and the battery pack is embedded, for example, in an electronic apparatus that is represented by a smart phone, and the like. The battery pack includes a battery cell 111, and a circuit substrate 116 that is connected to the battery cell 111. For example, the battery cell 111 is the laminated film type secondary battery according to the second embodiment.

A pair of adhesive tapes 118 and 119 is stuck on both surfaces of the battery cell 111. A protective circuit (protection circuit module (PCM)) is formed in the circuit substrate 116. The circuit substrate 116 is connected to a positive electrode lead 112 and a negative electrode lead 113 of the battery cell 111 through a pair of tabs 114 and 115, and is connected to a connector-attached lead line 117 for external connection. In addition, in a state in which the circuit substrate 116 is connected to the battery cell 111, the circuit substrate 116 is protected from an upper side and a lower side by a label 120 and an insulating sheet 131. Since the label 120 is stuck, the circuit substrate 116, the insulating sheet 131, and the like are fixed.

Figure 6:
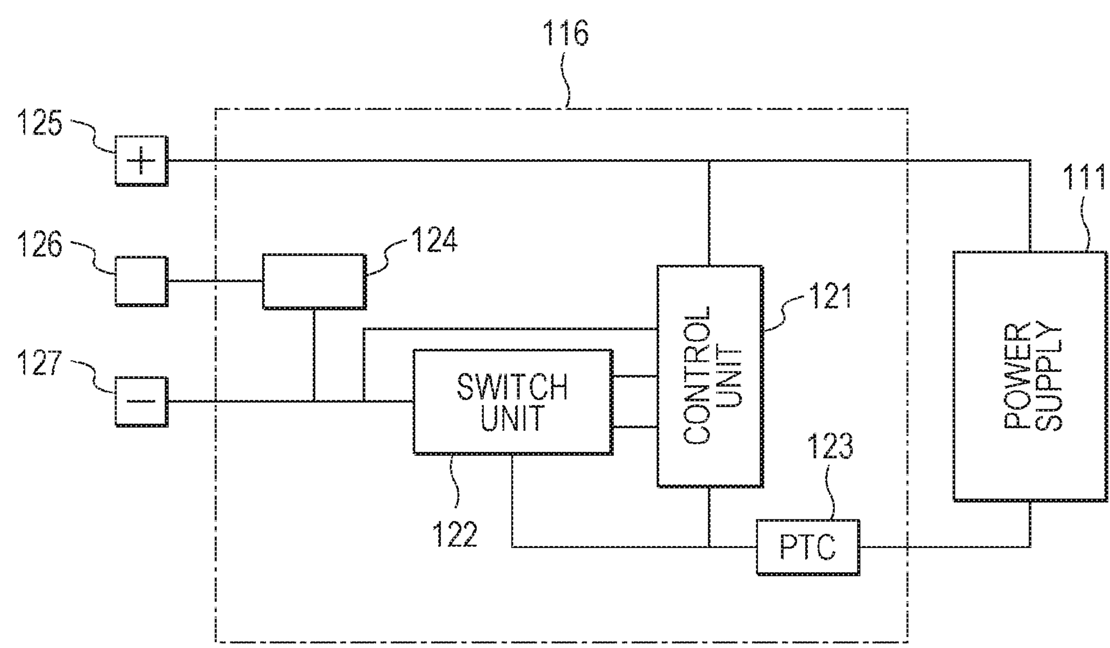
FIG. 6 is a block diagram illustrating a configuration example of the battery pack illustrated in FIG. 5.

In addition, as illustrated in FIG. 6, the battery pack includes the battery cell 111 corresponding to a power supply, and the circuit substrate 116. For example, the circuit substrate 116 includes a control unit 121, a switch unit 122, a PTC 123, and a temperature detecting unit 124. The battery cell 111 is capable of being connected to the outside through a positive electrode terminal 125 and a negative electrode terminal 127, and thus the battery cell 111 is charged and discharged through the positive electrode terminal 125 and the negative electrode terminal 127. The temperature detecting unit 124 can detect a temperature by using a temperature detection terminal (so-called T terminal) 126.

The control unit 121 controls an operation (including a usage state of the battery cell 111) of the entirety of the battery pack, and includes, for example, a central processing unit (CPU), a memory, and the like.

For example, when a battery voltage reaches an over-charging detection voltage, the control unit 121 cuts out the switch unit 122 in order for a charging current not to flow through a current path of the battery cell 111. In addition, for example, when a large current flows during charging, the control unit 121 cuts out the switch unit 122 so as to cut off the charging current.

In addition, for example, when the battery voltage reaches an over-discharging detection voltage, the control unit 121 cuts out the switch unit 122 in order for a discharging current not to flow through the current path of the battery cell 111. In addition, for example, when a large current flows during discharging, the control unit 121 cuts out the switch unit 122 so as to cut off the discharging current.

Furthermore, the over-charging detection voltage of the secondary battery is, for example, 4.20 V±0.05 V, and the over-discharging detection voltage is, for example, 2.4 V±0.1 V.

The switch unit 122 switches the usage state (connection and non-connection between the battery cell 111 and an external apparatus) of the battery cell 111 in response to an instruction of the control unit 121. For example, the switch unit 122 includes a charging control switch, a discharging control switch, and the like. For example, each of the charging control switch and the discharging control switch is a semiconductor switch such as a field effect transistor (MOSFET) using a metal oxide semiconductor. Furthermore, for example, the charging and discharging current is detected on the basis of ON-resistance of the switch unit 122.

The temperature detecting unit 124 measures a temperature of the battery cell 111, and outputs the measurement result to the control unit 121. For example, the temperature detecting unit 124 includes a temperature detecting element such as a thermistor. In addition, the measurement result obtained by the temperature detecting unit 124 is used for a case where the control unit 121 performs a charging and discharging control during abnormal heat generation, a case where the control unit 121 performs a correction process during calculation of a residual capacity, and the like.

Furthermore, the circuit substrate 116 may not include the PTC 123. In this case, a PTC element may be separately provided to the circuit substrate 116.

4. Fourth Embodiment

Figure 7:
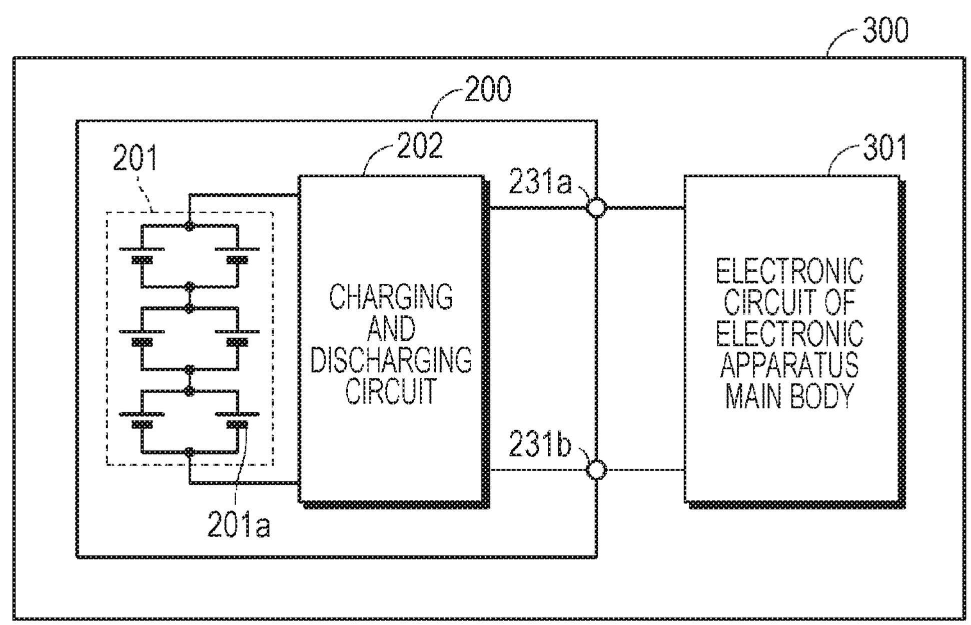
FIG. 7 is a block diagram illustrating a configuration example of an electronic apparatus according to an embodiment of the present technology.

In the fourth embodiment of the present technology, description will be given of an example of a configuration of an electronic apparatus with reference to FIG. 7.

An electronic apparatus 300 includes an electronic circuit 301 of an electronic apparatus main body, and a battery pack 200. The battery pack 200 is electrically connected to the electronic circuit 301 through a positive electrode terminal 231*a* and a negative electrode terminal 231*b*. For example, the electronic apparatus 300 has a configuration in which the battery pack 200 is detachable by a user. Furthermore, the configuration of the electronic apparatus 300 is not limited thereto, and the electronic apparatus 300 may have a configuration in which the battery pack 200 is embedded in the electronic apparatus 300 in order for the user not to detach the battery pack 200 from the electronic apparatus 300.

In charging of the battery pack 200, the positive electrode terminal 231*a* and the negative electrode terminal 231*b* of the battery pack 200 are connected to a positive electrode terminal and a negative electrode terminal of a charger (not illustrated), respectively. On the other hand, in discharging of the battery pack 200 (in use of the electronic apparatus 300), the positive electrode terminal 231*a* and the negative electrode terminal 231*b* of the battery pack 200 are connected to a positive electrode terminal and a negative electrode terminal of the electronic circuit 301, respectively.

Examples of the electronic apparatus 300 include a note-type personal computer, a tablet-type computer, a cellular phone (such as a smartphone), a personal digital assistant (PDA), a display apparatus (such as an LCD, an EL display, an electronic paper, a head-mounted display (HMD)), an image capturing apparatus (such as a digital still camera and a digital video camera), an audio apparatus (such as a portable audio player), a gaming machine, a cordless phone handset, an electronic book, an electronic dictionary, a radio, a headphone, a navigation system, a memory card, a pacemaker, a hearing aid, an electric tool, an electric shaver, a refrigerator, an air conditioner, a television, a stereo, a water heater, a microwave oven, a dishwasher, a washing machine, a dryer, an illumination apparatus, a toy, a medical apparatus, a robot, a road conditioner, a signal apparatus, and the like, and there is no limitation thereto.

(Electronic Circuit)

For example, the electronic circuit 301 includes a CPU, a peripheral logic unit, an interface unit, a storage unit, and the like, and controls the entirety of the electronic apparatus 300.

(Battery Pack)

The battery pack 200 is a battery pack of an assembled battery which includes an assembled battery 201 and a charging and discharging circuit 202. The assembled battery 201 is constituted by connecting a plurality of secondary batteries 201*a* in series and/or in parallel. For example, the plurality of secondary batteries 201*a* are connected in a type of n-parallel and m-series (n and m are positive integers). Furthermore, FIG. 7 illustrates an example in which six secondary batteries 201*a* are connected in a type of 2-parallel and 3-seires (2P3S). As the secondary batteries 201*a*, the battery according to the first embodiment is used.

In charging, the charging and discharging circuit 202 controls charging with respect to the assembled battery 201. On the other hand, in discharging (that is, in use of the electronic apparatus 300), the charging and discharging circuit 202 controls discharging with respect to the electronic apparatus 300.

The battery according to the first embodiment or the second embodiment, or the battery pack of a single battery according to the third embodiment may be used instead of the battery pack 200.

5. Fifth Embodiment

In the fifth embodiment of the present technology, description will be given of an example of an electrical storage system in which an electrical storage device is provided with the battery according to the first embodiment or the second embodiment.

The electrical storage system may be any system as long as the system uses electric power, and also includes a simple electric power apparatus. For example, the electric power system includes a smart grid, a home energy management system (HEMS), a vehicle, and the like, and can store electricity.

For example, the electrical storage device (electrical storage module) is applied to a power supply for electric power storage in buildings including a house or a power generation facility. Examples of the electrical storage device include an electrical storage module that includes a battery block in which a plurality of batteries are connected to each other in at least one of a parallel type or a series type, and a control unit that control charging and discharging of the battery block. In an example of a configuration of the electrical storage device, a plurality of battery blocks are accommodated in an external packaging case. As a battery, the battery according to the first embodiment can be used.

Examples of the electrical storage system include the following first to fifth electrical storage systems, and the like. The first electrical storage system is an electrical storage system in which an electrical storage device is charged by a power generator that performs power generation from renewable energy. A second electrical storage system is an electrical storage system that is provided with an electrical storage device and supplies electric power to an electronic apparatus that is connected to the electrical storage device. A third electrical storage system is an electrical storage system including an electronic apparatus to which electric power is supplied from an electrical storage device. The electrical storage systems are executed as a system that realizes effective power supply in cooperation with an external power supply network.

The fourth electrical storage system is an electric power system that is provided with an electric power information transmitting and receiving unit that transmits and receives a signal to and from other apparatuses through a network, and performs a charging and discharging control of the above-described electrical storage device on the basis of the information that is received by the transmitting and receiving unit. The fifth electrical storage system is an electric power system to which electric power is supplied from the above-described electrical storage device or which supplies electric power from a power generator or an electric power network to the electrical storage device. Hereinafter, description will be given of an electrical storage system that is applied to a house and an electrically driven vehicle.

(Configuration of Electrical Storage System)

Figure 8:
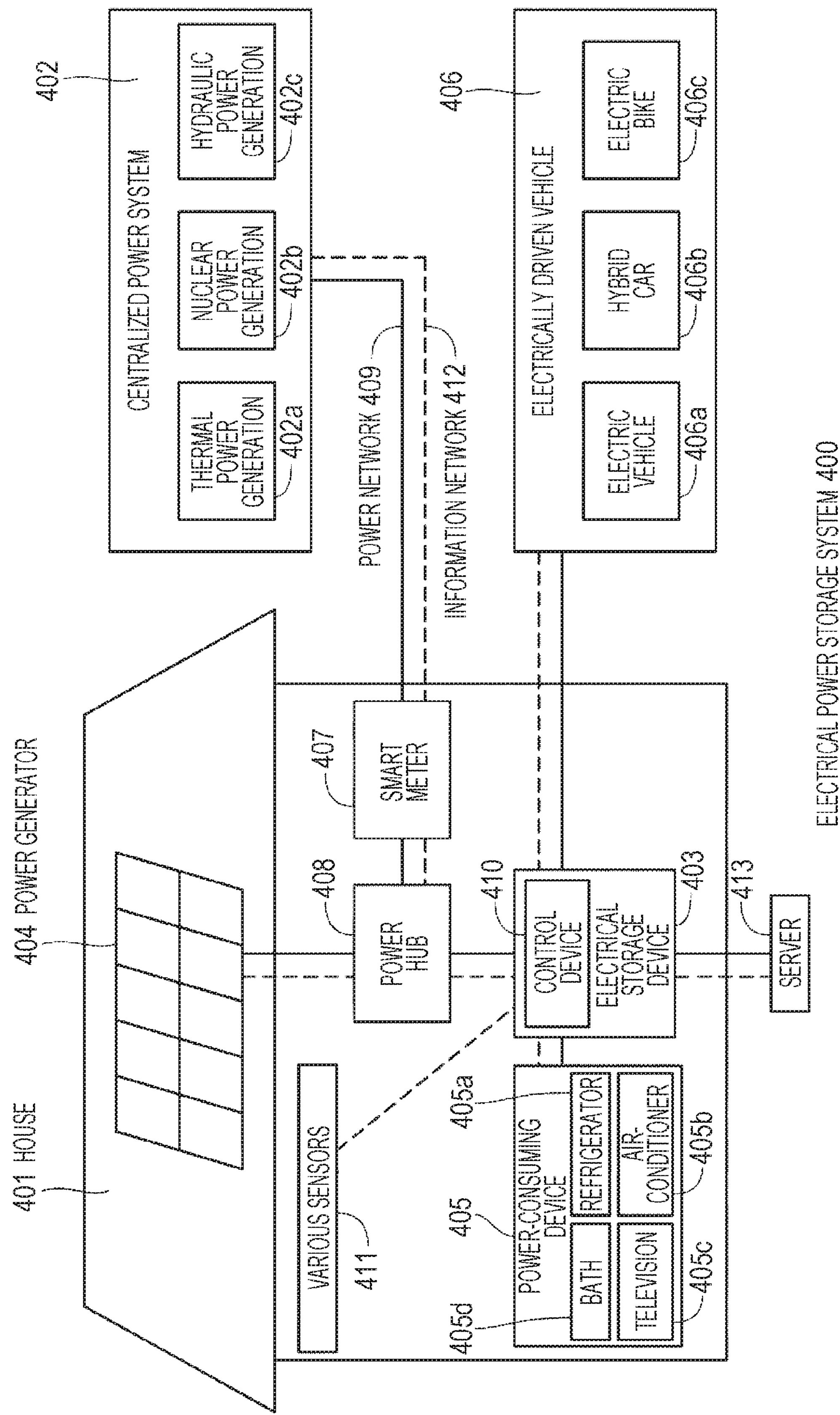
FIG. 8 is a schematic view illustrating a configuration example of an electrical storage system according to an embodiment of the present technology.

Hereinafter, description will be given of a configuration example of an electrical storage system (electric power system) 400 according to the fifth embodiment with reference to FIG. 8. The electrical storage system 400 is an electrical storage system for house, and electric power is supplied to an electrical storage device 403 from a centralized power system 402 such as thermal power generation 402*a*, nuclear power generation 402*b*, hydraulic power generation 402*c* through a power network 409, an information network 412, a smart meter 407, a power hub 408, and the like. In addition, electric power from an independent power supply such as an in-house power generator 404 is supplied to the electrical storage device 403. The electric power supplied to the electrical storage device 403 is stored. Electric power that is used in a house 401 is supplied by using the electrical storage device 403. A similar electrical storage system may also be used with respect to a building without limitation to the house 401.

The in-house power generator 404, power-consuming devices 405, the electrical storage device 403, a control device 410 that controls respective devices, the smart meter 407, the power hub 408, and sensors 411 which acquire various pieces of information are provided in the house 401. The respective devices are connected by the power network 409 and the information network 412. As the in-house power generator 404, a solar cell, a fuel cell, and the like are used, and generated power is supplied to the power-consuming devices 405 and/or the electrical storage device 403. Examples of the power-consuming devices 405 include a refrigerator 405*a*, an air-conditioner 405*b*, a television receiver 405*c*, a bath 405*d*, and the like. In addition, examples of the power-consuming device 405 include an electrically driven vehicle 406. Examples of the electrically driven vehicle 406 include an electric vehicle 406*a*, a hybrid car 406*b*, an electric bike 406*c*, and the like.

The electrical storage device 403 includes one or more batteries according to the first embodiment or the second embodiment. The smart meter 407 has a function of measuring the amount of commercial power used and of transmitting the measured amount of commercial power used to a power company. The power network 409 may be anyone of a DC power supply type, an AC power supply type, and non-contact power supply type, or a combination of a plurality of the types.

Examples of the various sensors 411 include a motion sensing sensor, a luminance sensor, an object sensing sensor, a power-consumption sensor, a vibration sensor, a contact sensor, a temperature sensor, an infrared sensor, and the like. Information acquired by the various sensors 411 is transmitted to the control device 410. Weather conditions, conditions of human, or the like is grasped by the information transmitted from the sensors 411, and the power-consuming devices 405 are automatically controlled. Accordingly, it is possible to minimize energy consumption. In addition, the control device 410 may transmit information related to the house 401 to an external power company and the like through the Internet.

Processes such as divergence of power lines and DC-AC conversion are performed by the power hub 408. Examples of a communication method of the information network 412 connected to the control device 410 include a method using a communication interface such as a universal asynchronous receiver-transmitter (UART: transmission and reception circuit for asynchronous serial communication), and a method using a sensor network compliant to a wireless communication standard such as Bluetooth (registered trademark), ZigBee, and Wi-Fi. The Bluetooth (registered trademark) method is applied to a multimedia communication and can perform a one-to-multi-connection communication. The ZigBee uses a physical layer of institute of electrical and electronics engineers (IEEE) 802.15.4. IEEE 802.15.4 is the name of a short-range wireless network standard called a personal area network (PAN) or wireless (W) PAN.

The control device 410 is connected to an external server 413. The server 413 may be managed by any one of the house 401, the power company, and a service provider. Examples of information that is transmitted to and received from the server 413 include power-consumption information, life pattern information, power rates, weather information, disaster information, and information related to power transaction. These kinds of information may be transmitted to and received from in-house power-consuming devices (for example, a television receiver), but may be transmitted to and received from devices (for example, cellular phones, or the like) located on an outer side of the house. These kinds of information may be displayed on devices such as a television receiver, a cellular phone, and a PDA which have a display function.

The control device 410 that controls each unit includes a CPU, a random access memory (RAM), a read only memory (ROM), and the like, and is accommodated in the electrical storage device 403 in this example. The control device 410 is connected to the electrical storage device 403, the in-house power generator 404, the power-consuming devices 405, the various sensors 411, and the server 413 through the information network 412, and has, for example, a function of adjusting the amount of commercial power used and the amount of power generation. Furthermore, in addition to this function, the control device 410 may have a function of performing power transaction in a power market, and the like.

As described above, a generated output of the in-house power generator 404 (photovoltaic generation and wind power generation) as well as the centralized power system 402 such as the thermal generation 402*a*, the nuclear power generation 402*b*, and the hydraulic power generation 402*c* may be stored in the electrical storage device 403. Accordingly, even when the generated output of the in-house power generator 404 varies, it is possible to make the amount of power transmitted to an outer side uniform, or it is possible to control discharging as much as necessary. For example, a usage method described below may be considered. Specifically, the electric power that is obtained from the photovoltaic generation is stored in the electrical storage device 403, and inexpensive midnight power is also stored in the electrical storage device 403 at night, and then the electric power that is stored in the electrical storage device 403 is discharged to be used in a period of time at which a rate is expensive in the day time.

In addition, in this example, description has been given of an example in which the control device 410 is accommodated in the electrical storage device 403, but the control device 410 may be accommodated in the smart meter 407, or may be configured independently. Furthermore, the electrical storage system 400 may be used in a plurality of homes as targets in regard to an apartment house, or may be used in a plurality of detached houses as targets.

6. Sixth Embodiment

In the sixth embodiment of the present technology, description will be given of an example of an electrically driven vehicle that includes the battery according to the first embodiment or the second embodiment. Examples of the electrically driven vehicle include a railway vehicle, a golf cart, an electrically driven cart, an electric vehicle (including a hybrid car), a working vehicle (such as a tractor and a combine) for farming. Hereinafter, an example of the electric vehicle will be described.

Figure 9:
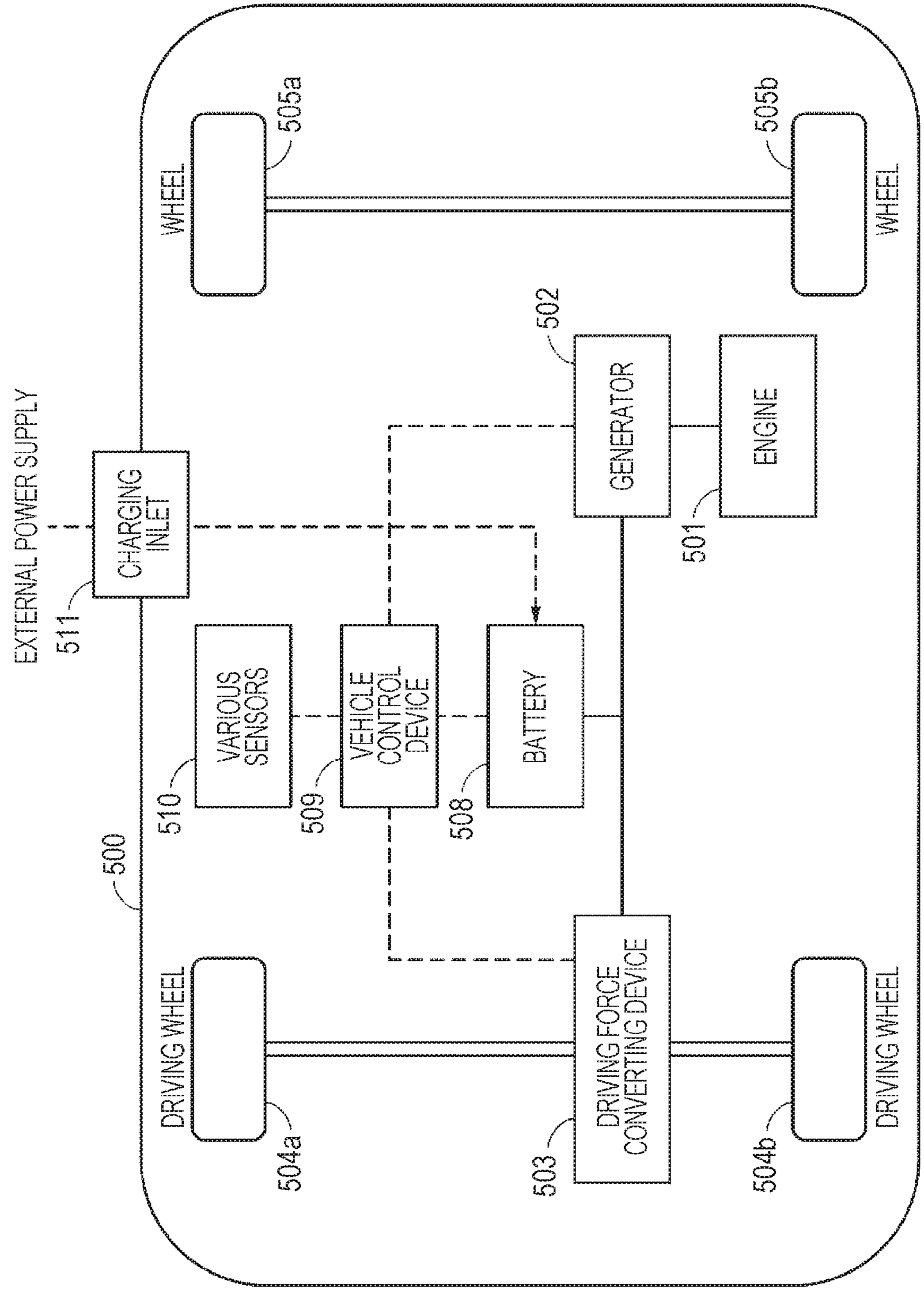
FIG. 9 is a schematic view illustrating a configuration example of an electrically driven vehicle according to an embodiment of the present technology.

Description will be given of a configuration example of the electrically driven vehicle according to the sixth embodiment of the present technology with reference to FIG. 9. A hybrid car 500 is a hybrid car that employs a series hybrid system. The series hybrid system relates to a vehicle that uses electric power that is generated by a generator that is moved by an engine or the electric power that is stored at once in a battery, and travels with a power-driving force converting device 503.

In the hybrid car 500, an engine 501, a generator 502, the power-driving force converting device 503, a driving wheel 504*a*, a driving wheel 504*b*, a wheel 505*a*, a wheel 505*b*, a battery 508, a vehicle control device 509, various sensors 510, and a charging inlet 511 are mounted. As the battery 508, the battery according to the first embodiment or the second embodiment is used.

The hybrid car 500 travels by using the power-driving force converting device 503 as a power source. An example of the power-driving force converting device 503 is a motor. The power-driving force converting device 503 operates by electric power of the battery 508, and the torque of the power-driving force converting device 503 is transmitted to the driving wheels 504*a* and 504*b*. In addition, the power-driving force converting device 503 is applicable to an AC motor or a DC motor by using DC-AC conversion or invert conversion (AC-DC conversion) at a necessary site. The various sensors 510 control the engine speed or the opening degree (throttle opening degree) of a throttle valve (not illustrated) through the vehicle control device 509. Examples of the various sensors 510 include a speed sensor, an acceleration sensor, an engine speed sensor, and the like.

The torque of the engine 501 can be transmitted to the generator 502, and electric power generated by the generator 502 using the torque can be stored in the battery 508.

When the hybrid car 500 is decelerated by a brake mechanism (not illustrated), a resistance force during the deceleration is added to the power-driving force converting device 503 as a torque, and regenerated electric power that is generated by the power-driving force converting device 503 due to the torque is stored in the battery 508.

When the battery 508 is connected to an external power supply of the hybrid car 500 through the charging inlet 511, electric power can be supplied to the battery 508 from the external power supply by using the charging inlet 511 as an input inlet, and the battery 508 can store the electric power that is supplied.

Although not illustrated, an information processing device that performs information processing related to a vehicle control on the basis of information related to the battery may be provided. Examples of the information processing device include an information processing device that performs displaying of a residual amount of the battery on the basis of information related to the residual amount of the battery, and the like.

In addition, hereinbefore, description has been given of the series hybrid car that travels with a motor by using electric power generated by a generator moved by an engine, or the electric power that is temporarily stored in a battery as an example. However, the present technology is effectively applicable to a parallel hybrid car that uses both the output of the engine and the output of the motor as driving sources, and utilizes three types of traveling using the engine only, traveling using the motor only, and traveling using the engine and motor by appropriately switching these types. In addition, the present technology is effectively applicable to a so-called electrically driven vehicle that travels using driving by a driving motor only without using the engine.

EXAMPLES

Hereinafter, the present technology will be described in detail with reference to examples. Furthermore, the present technology is not limited by configurations of the following examples.

Example 1-1

(Preparation of Negative Electrode)

100 parts by mass of alloy, which contains silicon and iron as a main component, as a negative electrode active material, and 10 parts by mass of lithium polyacrylate (weight-average molecular weight: 250,000) and 5 parts by mass of polyvinylidene fluoride (kynar HSV900 manufactured by ARKEMA K.K.) (the total amount of the binding agent is 15 parts by mass) as a binding agent were dispersed in pure water to prepare slurry-like negative electrode mixture slurry.

Next, the negative electrode mixture slurry was uniformly applied to both surfaces of strip-shaped copper foil having a thickness of 8 μm. Then, the applied negative electrode mixture slurry was dried and was compression-molded. Then, the resultant compression-molded body was cut out to prepare a negative electrode. Then, a negative electrode lead was attached to one end of a negative electrode current collector through welding.

(Preparation of Positive Electrode)

98 parts by mass of lithium cobaltite ($LiCoO_2$) as a positive electrode active material, 1 part by mass of carbon black as a conductive agent, and 1 part by mass of polyvinylidene fluoride as a binding agent were mixed with each other to obtain a positive electrode mixture. Next, the positive electrode mixture was dispersed in N-methyl-2-pyrrolidone (NMP) to prepare a slurry-like positive electrode mixture slurry.

Next, the positive electrode mixture slurry was applied to both surfaces of strip-shaped aluminum foil having a thickness of 10 μm and was dried, and then the applied positive electrode mixture slurry was compression-molded with a roll pressing device to form a positive electrode active material layer. Then, a positive electrode lead was attached to one end of a positive electrode current collector through welding.

(Formation of Gel Electrolyte Layer)

Lithium hexafluorophosphate ($LiPF_6$) as an electrolyte salt was dissolved in a nonaqueous solvent, which was obtained by mixing ethylene carbonate (EC) and propylene carbonate (PC) in a mass ratio of 5:5, in a concentration of 1 mol/kg to prepare a nonaqueous electrolytic solution.

Continuously, polyvinylidene fluoride was used as a polymeric compound that retains the nonaqueous electrolytic solution, and the nonaqueous electrolytic solution, the polyvinylidene fluoride, and dimethyl carbonate (DMC) as a plasticizer were mixed with each other to prepare a sol-state precursor solution.

Continuously, the precursor solution was applied to both surfaces of each of the positive electrode and the negative electrode and was dried to remove the plasticizer. With this arrangement, a gel electrolyte layer was formed on the surface of the positive electrode and the surface of the negative electrode.

(Assembly of Laminated Film Type Battery)

Next, a microporous polyethylene film was prepared as a separator. Next, the positive electrode and the negative electrode in which the gel electrolyte layer was formed on both surfaces thereof, and the separator were laminated in the order of the positive electrode, the separator, and the negative electrode, and the resultant laminated body was wound. Then, a winding end portion was fixed with an adhesive tape to form a wound electrode body.

Next, two sheets of laminated films having a structure, in which aluminum foil was interposed between a pair of resin films, were prepared as an exterior packaging member. Next, the wound electrode body was interposed between the two sheets of laminated films, and an adhesive film was inserted between each of the positive electrode lead and the negative electrode lead, and each of the laminated films. Then, among peripheral sides of the wound electrode body, one side from which the positive electrode lead and the negative electrode lead are led out, and the remaining three sides were respectively sealed through thermal fusion under reduced pressure. Accordingly, the wound electrode body was hermetically closed. With this arrangement, the laminated film type battery was prepared.

Example 1-2

During preparation of the negative electrode, the amount of polyvinylidene fluoride contained was set to 5 parts by mass without any change, and only the amount of lithium polyacrylate contained was changed to 5 parts by mass. With this arrangement, the total amount of the binding agent was changed to 10 parts by mass. A laminated film type battery was prepared in a similar manner as in Example 1-1 except for the difference.

Example 1-3

During preparation of the negative electrode, the amount of lithium polyacrylate contained was changed to 15 parts by mass, and the amount of polyvinylidene fluoride contained was changed to 15 parts by mass. With this arrangement, the total amount of the binding agent was changed to 30 parts by mass. A laminated film type battery was prepared in a similar manner as in Example 1-1 except for the difference.

Example 1-4

During preparation of the negative electrode, the amount of polyvinylidene fluoride contained was set to 5 parts by mass without any change, and only the amount of lithium polyacrylate contained was changed to 15 parts by mass. With this arrangement, the total amount of the binding agent was changed to 20 parts by mass. A laminated film type battery was prepared in a similar manner as in Example 1-1 except for the difference.

Example 1-5

During preparation of the negative electrode, the amount of lithium polyacrylate contained was set to 10 parts by mass without any change, and only the amount of polyvinylidene fluoride contained was changed to 0.5 parts by mass. With this arrangement, the total amount of the binding agent was changed to 10.5 parts by mass. A laminated film type battery was prepared in a similar manner as in Example 1-1 except for the difference.

Example 1-6

During preparation of the negative electrode, the amount of lithium polyacrylate contained was set to 10 parts by mass without any change, and only the amount of polyvinylidene fluoride contained was changed to 15 parts by mass. With this arrangement, the total amount of the binding agent was changed to 25 parts by mass. A laminated film type battery was prepared in a similar manner as in Example 1-1 except for the difference.

Comparative Example 1-1

During preparation of the negative electrode, the amount of lithium polyacrylate contained was set to 10 parts by mass without any change, and polyvinylidene fluoride was not mixed and the amount of polyvinylidene fluoride contained was set to 0 part by mass. With this arrangement, the total amount of the binding agent was changed to 10 parts by mass. A laminated film type battery was prepared in a similar manner as in Example 1-1 except for the difference.

Comparative Example 1-2

During preparation of the negative electrode, the amount of lithium polyacrylate contained was changed to 20 parts by mass, and polyvinylidene fluoride was not mixed and the amount of polyvinylidene fluoride contained was set to 0 part by mass. With this arrangement, the total amount of the binding agent was changed to 20 parts by mass. A laminated film type battery was prepared in a similar manner as in Example 1-1 except for the difference.

Comparative Example 1-3

During preparation of the negative electrode, the amount of polyvinylidene fluoride contained was changed to 10 parts by mass, and lithium polyacrylate was not mixed and the amount of lithium polyacrylate was set to 0 part by mass. With this arrangement, the total amount of the binding agent was changed to 10 parts by mass. A laminated film type battery was prepared in a similar manner as in Example 1-1 except for the difference.

Comparative Example 1-4

During preparation of the negative electrode, the amount of lithium polyacrylate contained was changed to 20 parts by mass, and the amount of polyvinylidene fluoride contained was changed to 20 parts by mass. With this arrangement, the total amount of the binding agent was changed to 40 parts by mass. A laminated film type battery was prepared in a similar manner as in Example 1-1 except for the difference.

Comparative Example 1-5

A laminated film type battery was prepared in a similar manner as in Example 1-1 except that polyacrylic acid was mixed instead of lithium polyacrylate during preparation of the negative electrode.

Comparative Example 1-6

During preparation of the negative electrode, the amount of polyvinylidene fluoride contained was changed to 5 parts by mass, and lithium polyacrylate was not mixed and the amount of lithium polyacrylate contained was set to 0 part by mass. With this arrangement, the total amount of the binding agent was changed to 5 parts by mass. A laminated film type battery was prepared in a similar manner as in Example 1-1 except for the difference.

(Evaluation)

The following cycle characteristic evaluation was performed with respect to the batteries which were prepared.

(100-Cycle Capacity Retention Rate)

The following 100-cycle capacity retention rate was measured by repetitively performing charging and discharging with respect to the batteries which were prepared.

100-cycle capacity retention rate (%)=[Discharging capacity after 100 cycles/discharging capacity at the first cycle]×100(%)

(Creation of Graph Illustrating Variation of Capacity Retention Rate)

Charging and discharging were repetitively performed with respect to the batteries which were prepared so as to create a graph obtained by plotting the capacity retention rate with respect to the number of cycles.

(Charging and Discharging Conditions)

In the cycle characteristic evaluation, charging and discharging of the batteries were performed as follows. Charging was performed with a charging voltage of 4.35 V and a charging current of 0.7 C in accordance with a constant-current and constant-voltage method. Discharging was performed with a discharging current of 0.5 C and a cut-off voltage of 3 V in accordance with a constant-current method. Furthermore, 0.1 C is a current value at which a theoretical capacity is completely discharged (or charged) for 10 hours.

(Results)

Figure 10:
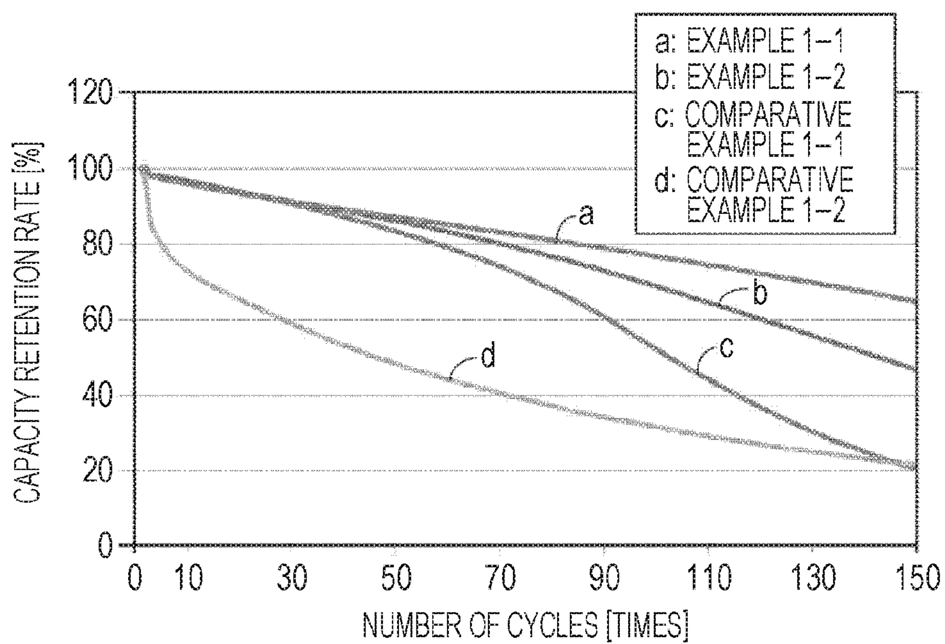
FIG. 10 is a graph in which a capacity retention rate is plotted with respect to the number of cycles.
Figure 11:
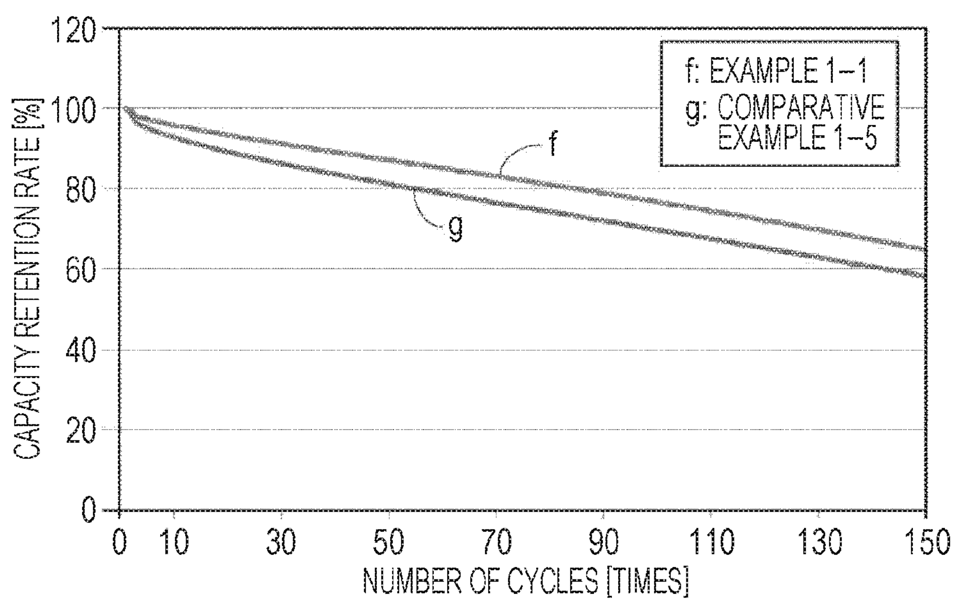
FIG. 11 is a graph in which the capacity retention rate is plotted with respect to the number of cycles.
Figure 12:
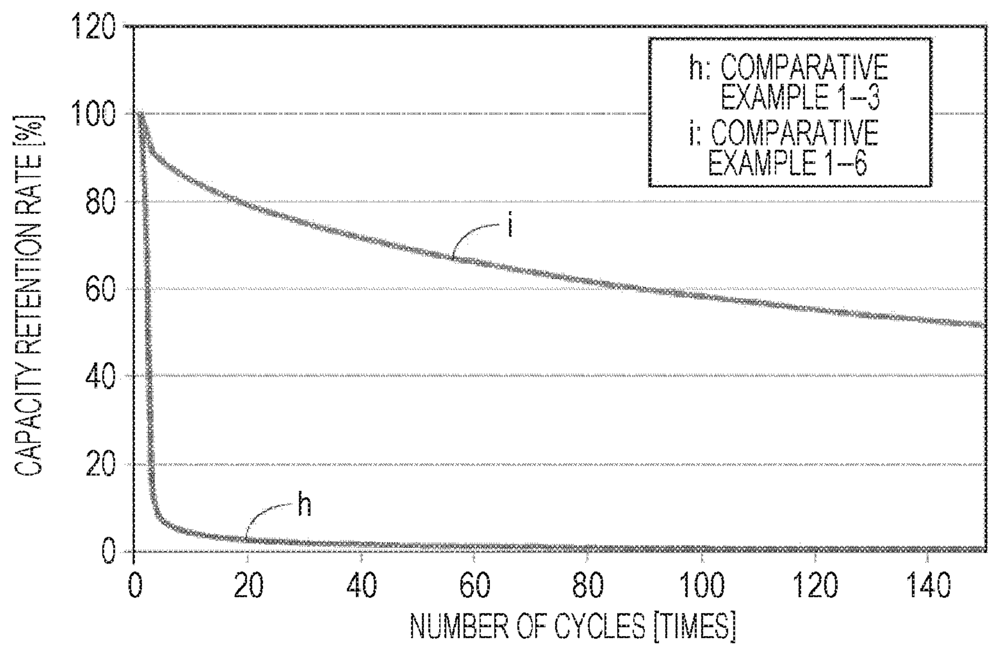
FIG. 12 is a graph in which the capacity retention rate is plotted with respect to the number of cycles.

Measurement results of Example 1-1 to Example 1-6, and Comparative Example 1-1 to Comparative Example 1-4 are illustrated in Table 1. FIG. 10 illustrates the measurement results of Example 1-1, Example 1-2, Comparative Example 1-1, and Comparative Example 1-2. FIG. 11 illustrates the measurement results of Example 1-1 and Comparative Example 1-5. FIG. 12 illustrates the measurement results of Comparative Example 1-3 and Comparative Example 1-6.

TABLE 1

| | Negative electrode active material [parts by mass] | Binding agent: Lithium polyacrylate [parts by mass] | Binding agent: Poly-vinylidene fluoride [parts by mass] | Binding agent: Total amount [parts by mass] | 100-cycle capacity retention rate [%] |
|---|---|---|---|---|---|
| Example 1-1 | 100 | 10 | 5 | 15 | 77 |
| Example 1-2 | | 5 | 5 | 10 | 70 |
| Example 1-3 | | 15 | 15 | 30 | 62 |
| Example 1-4 | | 15 | 5 | 20 | 72 |
| Example 1-5 | | 10 | 0.5 | 10.5 | 53 |
| Example 1-6 | | 10 | 15 | 25 | 57 |
| Comparative Example 1-1 | 100 | 10 | 0 | 10 | 52 |
| Comparative Example 1-2 | | 20 | 0 | 20 | 32 |
| Comparative Example 1-3 | | 0 | 10 | 10 | 2 |
| Comparative Example 1-4 | | 20 | 20 | 40 | ※ |

※ In Comparative Examples 1 to 4, charging and discharging efficiency was significantly poor, and cycle characteristic evaluation was impossible From the results in Table 1, it could be confirmed that the cycle characteristics can be improved in Example 1-1 to Example 1-6.

From the results in FIG. 11, it could be confirmed that in Example 1-1, the cycle characteristics can be further improved in comparison to Comparative Example 1-5 in which polyacrylic acid was used. From the results in FIG. 12, it could be confirmed that when the amount of polyvinylidene fluoride increases, the cycle characteristics significantly deteriorates. In contrast, when using both of polyvinylidene fluoride and lithium polyacrylate as the binding agent, deterioration of the cycle characteristics could be suppressed.

(Evaluation)

Whether or not cracking occurred in the negative electrode active material layer during preparation of the negative electrode was confirmed with the naked eyes in accordance with the following process, and process suitability was evaluated in accordance with the confirmation.

1. Punching Test

The negative electrode was punched in a circle of ϕ15 mm, and whether or not cracking and breakage occurred in an end was confirmed with the naked eyes.

2. Winding Test

The negative electrode was wound around a round rod having a dimension of ϕ50 mm, and process suitability with respect to bending was confirmed with the naked eyes.

(Results)

In Comparative Example 1-1 or Comparative Example 1-2 in which the amount of lithium polyacrylate was great, the binding agent was deficient in flexibility, and thus cracking was confirmed in the negative electrode active material layer in both of the tests. On the other hand, in Example 1-1 to Example 1-6, the cracking did not occur in both of the tests. With this arrangement, it could be confirmed that the process suitability can be improved in Example 1-1 to Example 1-6.

(Evaluation)

(Measurement of Peeling Strength)

A peeling strength test was performed with respect to Example 1-1, Example 1-2, Comparative Example 1-1, and Comparative Example 1-3. The peeling strength test was performed as follows to measure the peeling strength of the negative electrode active material layer that was formed on the negative electrode current collector.

In the peeling strength test, measurement was performed through a 180°-peeling test.

The negative electrodes, which were prepared, were cut in a width of 20 mm and a length of 80 mm and were set as test specimens. A typical adhesive tape was adhered to a negative electrode active material applied surface (surface on one side). An SUS plate was used as a test plate on which each of the test specimens was set, and a negative electrode active material applied surface (the other surface on which the adhesive tape was not stuck) of the test specimen, and the SUS plate were bonded to each other with a double-sided tape.

When peeling-off the negative electrode active material layer of the test specimen from the negative electrode current collector (copper foil), an end of the adhesive tape was folded back by 180° and was peeled off by approximately 10 mm, and a portion of the test specimen, from which the negative electrode active material layer was peeled off, was fixed to a jig of a tester in combination with one end of the test plate, and an adhesive tape was fixed to an upper jig. A test was performed at a speed of 100 mm/min. Initial measured values up to 20 mm were ignored, and then an average of measurement values up to a peeled-off length of 30 mm was set as a value of the peeling strength.

(Results)

Measurement results are illustrated in Table 2.

TABLE 2

| | Negative electrode active material [parts by mass] | Binding agent: Lithium polyacrylate [parts by mass] | Binding agent: Poly-vinylidene fluoride [parts by mass] | Binding agent: Total amount [parts by mass] | Peeling strength [mN/mm] |
|---|---|---|---|---|---|
| Example 1-1 | 100 | 10 | 5 | 15 | 84.0 |
| Example 1-2 | | 5 | 5 | 10 | 67.2 |
| Comparative Example 1-1 | 100 | 10 | 0 | 10 | 42.5 |
| Comparative Example 1-3 | | 0 | 10 | 10 | 59.4 |

As illustrated in Table 2, in Example 1-1 and Example 1-2, since both of lithium polyacrylate and polyvinylidene fluoride were used as the binding agent, it was confirmed that the peeling strength of the negative electrode active material layer can be improved.

Example 2-1

(Preparation of Negative Electrode)

A negative electrode was prepared in a similar manner as in Example 1-1.

(Preparation of Positive Electrode)

A positive electrode was prepared in a similar manner as in Example 1-1.

(Preparation of Coin Cell)

A coin-type battery (hereinafter, referred to as "coin cell") having 2016 size (size 20 mm (diameter) and 1.6 mm (height)) was prepared as follows.

The positive electrode and the negative electrode were punched in a circle shape having a diameter of 15 mm. Next, a polyethylene microporous film was prepared as a separator.

Next, a nonaqueous electrolytic solution similar to that of Example 1-1 was prepared.

Next, the positive electrode and the negative electrode, which were prepared, were laminated with the microporous film interposed therebetween to obtain a laminated body. The laminated body and the nonaqueous electrolytic solution were accommodated in an exterior packaging cup and an exterior packaging casing, and the exterior packaging cup and the exterior packaging casing were caulked through a gasket. With this arrangement, a target coin cell was obtained.

Comparative Example 2-1

During preparation of the negative electrode, the amount of lithium polyacrylate contained was set to 10 parts by mass without any change, and polyvinylidene fluoride was not mixed and the amount of polyvinylidene fluoride contained was set to 0 part by mass. With this arrangement, the total amount of the binding agent was changed to 10 parts by mass. A coin cell was prepared in a similar manner as in Example 2-1 except for the difference.

Comparative Example 2-2

During preparation of the negative electrode, the amount of polyvinylidene fluoride contained was changed to 10 parts by mass, and lithium polyacrylate was not mixed and the amount of lithium polyacrylate contained was set to 0 part by mass. With this arrangement, the total amount of the binding agent was changed to 10 parts by mass. A coin cell was prepared in a similar manner as in Example 2-1 except for the difference.

(Measurement of Expansion Rate)

With respect to the coin cell that was prepared, 1-cycle charging and discharging were performed under similar conditions as in Example 1-1 to measure an expansion rate in charging (full charging). Furthermore, the expansion rate was obtained by the following expression after measuring the thickness (referred to as "assembly thickness") of the negative electrode after assembly of the coin cell and before charging and discharging, and the thickness (referred to as "full-charging thickness") of the negative electrode in full charging.

Expansion rate (%)=(Full-charging thickness/assembly thickness)×100(%)

(Observation of Electrode State)

In addition, after performing the charging and discharging test, the negative electrode taken from the coin cell was observed with the naked eyes so as to confirm whether or not peeling-off of the negative electrode active material layer occurred or a damage occurred in the negative electrode current collector (copper foil).

(Results)

Measurement results are illustrated in Table 3.

TABLE 3

| | Negative electrode active material [parts by mass] | Binding agent: Lithium polyacrylate [parts by mass] | Polyvinylidene fluoride [parts by mass] | Total amount [parts by mass] | Assembly thickness [μm] | Full-charging thickness [μm] | Expansion rate [%] |
|---|---|---|---|---|---|---|---|
| Example 2-1 | 100 | 10 | 5 | 15 | 38 | 44 | 115 |
| Comparative Example 2-1 | 100 | 10 | 0 | 10 | 37 | 50 | 135 |
| Comparative Example 2-2 | | 0 | 10 | 10 | 38 | 76 | 200 |

As illustrated in Table 3, expansion of the negative electrode could be suppressed in Example 2-1. On the other hand, in Comparative Example 2-1, the expansion rate was great. The reason for this is considered to be because lithium polyacrylate alone has a high binding force and thus can cope with a volume variation of each of particles, but an effect of suppressing the expansion of the negative electrode is week. In Comparative Example 2-2, the expansion rate was greater. The reason for this is considered to be because polyvinylidene fluoride alone has a low binding force, and thus a volume variation can be suppressed to a certain extent, but when the volume variation exceeds the limit, the effect of suppressing expansion of the negative electrode substantially disappears.

From results of the electrode state observation, in Example 2-1, peeling-off of the negative electrode active material layer did not occur, and a damage did not occur in the copper foil as a current collector. In Comparative Example 2-1, peeling-off of the negative electrode active material layer occurred, unevenness appeared on a surface of the copper foil, and a damage occurred in the copper foil. The reason for this is considered to be because lithium polyacrylate alone is deficient in flexibility. In Comparative Example 2-2, peeling-off of the negative electrode active material layer occurred, but a damage to the copper foil was less than in comparison to Comparative Example 2-1 due to flexibility of polyvinylidene fluoride.

Example 3-1

A laminated film type battery was prepared in a similar manner as in Example 1-1 except that silicon oxide ($SiO_x$) was used instead of an alloy that contains silicon and iron as the negative electrode active material.

Comparative Example 3-1

During preparation of the negative electrode, the amount of lithium polyacrylate contained was set to 10 parts by mass without any change, and polyvinylidene fluoride was not mixed and the amount of polyvinylidene fluoride contained was set to 0 part by mass. With this arrangement, the total amount of the binding agent was changed to 10 parts by mass. A laminated film type battery was prepared in a similar manner as in Example 3-1 except for the difference.

(Results)

Figure 13:
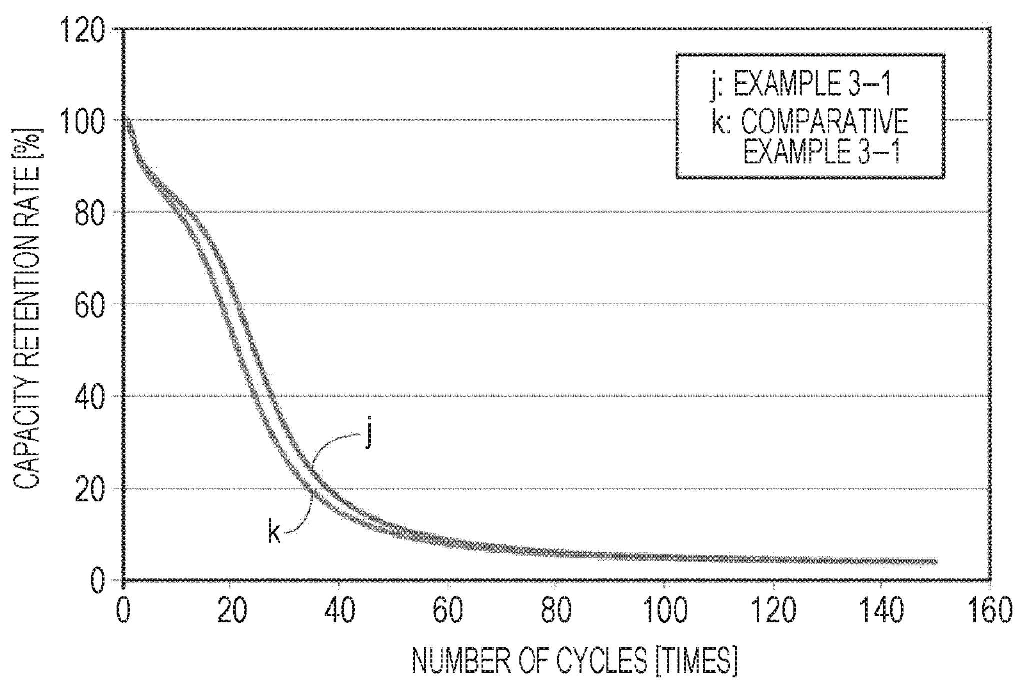
FIG. 13 is a graph in which the capacity retention rate is plotted with respect to the number of cycles.

Measurement results are illustrated in FIG. 13.

From the results in FIG. 13, it could be confirmed that even in the case of using silicon oxide as the negative electrode active material, when using lithium polyacrylate and polyvinylidene fluoride in a predetermined amount as the binding agent, it is possible to improve the cycle characteristics.

7. Other Embodiments (Modification Examples)

Hereinbefore, the present technology has been described with reference to the embodiments and examples. However, the present technology is not limited thereto, and various modifications can be made in a range of the gist of the present technology.

For example, the dimensions, the structures, the shapes, the materials, the raw materials, the manufacturing processes, and the like, which are exemplified in the above-described embodiments and examples, are illustrative only, and other dimensions, structures, shapes, materials, raw materials, manufacturing processes, and the like, which are different from those which are exemplified, may be used as necessary.

The configurations, the methods, the processes, the shapes, the materials, the dimensions, and the like of the above-described embodiments and examples may be combined with each other in a range not departing from the gist of the present technology.

The negative electrode of the present technology is also applicable to a case where the negative electrode has another battery structure such as a square shape. In the first and second embodiments, a laminated electrode body may be used instead of the wound electrode body. For example, the negative electrode is also applicable to a flexible battery and the like which are mounted on a wearable terminal such as a smart watch, a head-mounted display, and iGlass (registered trademark). The negative electrode of the present technology is also applicable to a battery that is mounted, for example, on a flying object such as an aircraft and a pilotless plane.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The present technology can employ the following configurations.

[1]

A negative electrode, including:

a negative electrode active material layer including a negative electrode active material and a binding agent, in which the negative electrode active material includes a silicon-containing material, the binding agent includes a fluorine-containing resin and a polyacrylic acid metal salt, and a total amount of the fluorine-containing resin and the polyacrylic acid metal salt is 10 parts by mass to 30 parts by mass on the basis of 100 parts by mass of the negative electrode active material.

[2]

The negative electrode according to [1], in which the amount of the polyacrylic acid metal salt contained is 5 parts by mass to 15 parts by mass on the basis of 100 parts by mass of the negative electrode active material, and the amount of the fluorine-containing resin contained is 0.5 parts by mass to 15 parts by mass on the basis of 100 parts by mass of the negative electrode active material.

[3]

The negative electrode according to [1] or [2], in which the silicon-containing material includes at least one of elementary silicon, a silicon alloy, and a silicon compound.

[4]

The negative electrode according to any of [1] to [3], in which the fluorine-containing resin is polyvinylidene fluoride.

[5]

The negative electrode according to any of [1] to [4], in which the polyacrylic acid metal salt is at least one of lithium polyacrylate, magnesium polyacrylate, and sodium polyacrylate.

[6]

The negative electrode according to any of [1] to [5], in which the silicon-containing material is an alloy that contains silicon and a metal.

[7]

The negative electrode according to [6], in which the metal that constitutes the alloy has ionization tendency higher than ionization tendency of hydrogen.

[8]

The negative electrode according to any of [1] to [7], in which the negative electrode active material layer is formed from a negative electrode mixture slurry, and the negative electrode mixture slurry is slurry in which the negative electrode active material and the binding agent are dispersed in a solvent including water.

[9]

A battery, including:

a positive electrode;

a negative electrode; and an electrolyte, in which the negative electrode includes a negative electrode active material layer including a negative electrode active material and a binding agent, the negative electrode active material includes a silicon-containing material, the binding agent includes a fluorine-containing resin and a polyacrylic acid metal salt, and a total amount of the fluorine-containing resin and the polyacrylic acid metal salt is 10 parts by mass to 30 parts by mass on the basis of 100 parts by mass of the negative electrode active material.

[10]

A battery pack, including:

the battery according to [9]; and a control unit that controls the battery.

[11]

An electronic apparatus, in which electric power is supplied from the battery according to [9].

[12]

An electrically driven vehicle, including:

the battery according to [9];

a conversion device to which electric power is supplied from the battery and which converts the electric power into a driving force of a vehicle; and a control device performs information processing related to a vehicle control on the basis of information related to the battery.

[13]

An electrical storage device, including:

the battery according to [9], in which the electrical storage device supplies electric power to an electronic apparatus that is connected to the battery.

[14]

The electrical storage device according to [13], further including:

an electric power information control device that transmits and receives a signal to and from other apparatuses via a network, in which a charging and discharging control of the battery is performed on the basis of information that is received by the electric power information control device.

[15]

An electric power system, in which electric power is supplied from the battery according to [9].

[16]

The electric power system according to [15], in which the electric power is supplied to the battery from a power generator or a power network.

REFERENCE SIGNS LIST

11 Battery casing
12, 13 Insulating plate
14 Battery lid
15A Disc plate
15 Safety valve mechanism
16 Positive temperature coefficient element
17 Gasket
20 Wound electrode body
21 Positive electrode
21A Positive electrode current collector
21B Positive electrode active material layer
22 Negative electrode
22A Negative electrode current collector
22B Negative electrode active material layer
23 Separator
24 Center pin
25 Positive electrode lead
26 Negative electrode lead
30 Wound electrode body
31 Positive electrode lead
32 Negative electrode lead
33 Positive electrode
34 Negative electrode
35 Separator
36 Electrolyte layer
111 Battery cell (power supply)
121 Control unit
200 Battery pack
201 Assembled battery
201*a* Secondary battery
300 Electronic apparatus
400 Electrical storage system
403 Electrical storage device
404 Power generator
406 Electrically driven vehicle
409 Power network
410 Control device
412 Information network
503 Power-driving force converting device
508 Battery
509 Vehicle control device

The invention claimed is:

1. A negative electrode, comprising:
a negative electrode active material layer including a negative electrode active material and a binding agent,
a gel electrolyte layer is provided on a surface of the negative electrode active material layer,
wherein the negative electrode active material includes a silicon-containing material,
the binding agent includes a fluorine-containing resin and a polyacrylic acid metal salt, and
a total amount of the fluorine-containing resin and the polyacrylic acid metal salt is 10 parts by mass to 30 parts by mass on the basis of 100 parts by mass of the negative electrode active material, wherein a content of the polyacrylic acid metal salt in the binding agent is greater than or equal to 50 mass. % and less than or equal to 75 mass. %.

2. The negative electrode according to claim 1,
wherein the amount of the polyacrylic acid metal salt is 5 parts by mass to 15 parts by mass on the basis of 100 parts by mass of the negative electrode active material, and
the amount of the fluorine-containing resin is 0.5 parts by mass to 15 parts by mass on the basis of 100 parts by mass of the negative electrode active material.

3. The negative electrode according to claim 1,
wherein the silicon-containing material includes at least one of elementary silicon, a silicon alloy, and a silicon compound.

4. The negative electrode according to claim 1,
wherein the fluorine-containing resin is polyvinylidene fluoride.

5. The negative electrode according to claim 1, wherein the binding agent further includes one or both of magnesium polyacrylate, and sodium polyacrylate.

6. The negative electrode according to claim 1, wherein the silicon-containing material is an alloy that contains silicon and a metal.

7. The negative electrode according to claim 6, wherein the metal that constitutes the alloy has ionization tendency higher than ionization tendency of hydrogen.

8. The negative electrode according to claim 1,
wherein the negative electrode active material layer is formed from a negative electrode mixture slurry, and
the negative electrode mixture slurry is slurry in which the negative electrode active material and the binding agent are dispersed in a solvent including water.

9. The negative electrode according to claim 1, wherein the polyacrylic acid metal salt includes lithium polyacrylate.

10. The negative electrode according to claim 1, wherein the silicon-containing material includes $SiO_x$ where $0<x<2$.

11. A battery, comprising:
a positive electrode;
a negative electrode; and
a gel electrolyte provided on a surface of the positive electrode and the negative electrode,
wherein the negative electrode includes a negative electrode active material layer including a negative electrode active material and a binding agent,
the negative electrode active material includes a silicon-containing material,
the binding agent includes a fluorine-containing resin and a polyacrylic acid metal salt, and
a total amount of the fluorine-containing resin and the polyacrylic acid metal salt is 10 parts by mass to 30 parts by mass on the basis of 100 parts by mass of the negative electrode active material, wherein a content of the polyacrylic acid metal salt in the binding agent is greater than or equal to 50 mass % and less than or equal to 75 mass %.

12. A battery pack, comprising:
the battery according to claim 11; and
a control unit that controls the battery.

13. An electronic apparatus,
wherein electric power is supplied from the battery according to claim 11.

14. An electrically driven vehicle, comprising:
the battery according to claim 11;
a conversion device to which electric power is supplied from the battery and which converts the electric power into a driving force of a vehicle; and
a control device performs information processing related to a vehicle control on the basis of information related to the battery.

15. An electrical storage device, comprising:
the battery according to claim 11,
wherein the electrical storage device supplies electric power to an electronic apparatus that is connected to the battery.

16. The electrical storage device according to claim 15, further comprising:

an electric power information control device that transmits and receives a signal to and from other apparatuses via a network, wherein a charging and discharging control of the battery is performed on the basis of information that is received by the electric power information control device.

17. An electric power system, wherein electric power is supplied from the battery according to claim 11.

18. The electric power system according to claim 17, wherein the electric power is supplied to the battery from a power generator or a power network.

19. The battery according to claim 11, wherein the polyacrylic acid metal salt includes lithium polyacrylate.

20. The battery according to claim 11, wherein the silicon-containing material includes $SiO_x$ where $0<x<2$.

* * * * *